United States Patent
Zhang et al.

(10) Patent No.: US 10,417,234 B2
(45) Date of Patent: Sep. 17, 2019

(54) DATA FLOW MODELING AND EXECUTION

(71) Applicant: SAP SE, Walldorf (DE)

(72) Inventors: Hanmei Zhang, Shanghai (CN);
Philippe Nemery, Brussels (BE);
Qinhe Lin, Shanghai (CN); Harald Hengelbrock, Heidelberg (DE)

(73) Assignee: SAP SE, Walldorf (DE)

( * ) Notice: Subject to any disclaimer, the term of this patent is extended or adjusted under 35 U.S.C. 154(b) by 245 days.

(21) Appl. No.: 15/288,881

(22) Filed: Oct. 7, 2016

(65) Prior Publication Data

US 2018/0101571 A1    Apr. 12, 2018

(51) Int. Cl.
*G06F 16/2455* (2019.01)
*G06F 16/2453* (2019.01)
*G06F 16/2458* (2019.01)
*G06F 16/901* (2019.01)

(52) U.S. Cl.
CPC .... *G06F 16/24561* (2019.01); *G06F 16/2456* (2019.01); *G06F 16/2474* (2019.01); *G06F 16/24544* (2019.01); *G06F 16/24545* (2019.01); *G06F 16/9024* (2019.01)

(58) Field of Classification Search
CPC ......... G06F 17/30466; G06F 17/30469; G06F 17/30569; G06F 8/10; G06F 3/0482; G06F 17/30563; G06F 8/34; G06F 17/30554; G06F 16/24544; G06F 16/24545; H04L 43/045; G06Q 30/02; G06Q 10/06
See application file for complete search history.

(56) References Cited

U.S. PATENT DOCUMENTS

| | | | | |
|---|---|---|---|---|
| 5,873,075 A | * | 2/1999 | Cochrane | G06F 17/30371 |
| 5,963,936 A | * | 10/1999 | Cochrane | G06F 17/30454 |
| 8,027,305 B1 | * | 9/2011 | Rogers | H04W 48/20 370/331 |
| 8,032,860 B2 | * | 10/2011 | Piehler | G06F 17/21 717/110 |
| 8,838,579 B2 | * | 9/2014 | Weyerhaeuser | G06F 16/24542 707/718 |
| 9,191,290 B2 | * | 11/2015 | Ding | H04L 43/062 |
| 9,607,049 B2 | * | 3/2017 | Agarwal | G06F 17/30011 |
| 2006/0129515 A1 | * | 6/2006 | Nagata | G06F 16/254 |

(Continued)

OTHER PUBLICATIONS

Schneider, I; Jackson, A; Lubas, R; Foreword, The Metadata Manual, Chandos Publishing: Cambridge, UK, Jul. 2013.*

(Continued)

*Primary Examiner* — James Trujillo
*Assistant Examiner* — Michal Lawrence Bogacki
(74) *Attorney, Agent, or Firm* — Klarquist Sparkman, LLP

(57) ABSTRACT

A data flow model format allows for improved data flow model creation and execution. The data flow models can provide a user with greater flexibility in selecting an appropriate data flow model, including providing information about the data flow model and selecting from multiple available data flow models. Tabular or graphical visualizations can aid the user in understanding a data flow model and retrieving desired information. Technical features such as designing a data flow with a single data output, and maintaining node identifiers in node metadata, can reduce coupling between software components and improve security and performance.

20 Claims, 17 Drawing Sheets

(56) References Cited

U.S. PATENT DOCUMENTS

| | | | |
|---|---|---|---|
| 2009/0217248 A1* | 8/2009 | Bently | G06F 8/30 717/132 |
| 2010/0114818 A1* | 5/2010 | Lier | G06F 17/30286 707/613 |
| 2010/0202343 A1* | 8/2010 | Hunzinger | H04B 7/155 370/315 |
| 2012/0054720 A1 | 3/2012 | Klein et al. | |
| 2012/0060143 A1* | 3/2012 | Nigul | G06F 8/00 717/103 |
| 2013/0290292 A1* | 10/2013 | Weyerhaeuser | G06F 17/30463 707/713 |
| 2013/0290293 A1* | 10/2013 | Weyerhaeuser | G06F 17/30433 707/714 |
| 2013/0332178 A1 | 12/2013 | Zhong et al. | |
| 2014/0258266 A1* | 9/2014 | Cruanes | G06F 16/24542 707/718 |
| 2014/0379520 A1 | 12/2014 | Nemery et al. | |
| 2015/0120731 A1 | 4/2015 | Nemery et al. | |
| 2015/0120732 A1 | 4/2015 | Nemery De Bellevaux et al. | |
| 2015/0178052 A1* | 6/2015 | Gupta | G06F 8/34 717/105 |
| 2015/0229619 A1* | 8/2015 | Costa | H04L 63/0823 713/171 |
| 2015/0269230 A1* | 9/2015 | Kardes | G06Q 50/01 707/692 |
| 2016/0042444 A1 | 2/2016 | Hengelbrock et al. | |
| 2016/0048803 A1 | 2/2016 | Cen et al. | |
| 2016/0055438 A1 | 2/2016 | Cen et al. | |
| 2016/0055494 A1 | 2/2016 | Ni et al. | |
| 2016/0125501 A1 | 5/2016 | Nemery et al. | |
| 2016/0154896 A1* | 6/2016 | Simitsis | G06F 16/2372 707/741 |
| 2016/0162527 A1* | 6/2016 | Freed | G06F 8/34 707/797 |
| 2016/0179883 A1* | 6/2016 | Chen | G06F 17/30292 707/714 |
| 2016/0275168 A1 | 9/2016 | Nemery et al. | |
| 2016/0291942 A1* | 10/2016 | Hutchison | G06F 8/451 |
| 2017/0132296 A1* | 5/2017 | Ding | G06F 17/30554 |
| 2017/0147594 A1* | 5/2017 | Huang | G06F 17/30 |
| 2018/0004746 A1* | 1/2018 | Hedinsson | G06F 17/30038 |
| 2018/0089270 A1* | 3/2018 | Qiu | G06F 16/24544 |

OTHER PUBLICATIONS

Lee, D. G., Zare, R; Meenakshisundaram, S; Carroll, M; Harinath, S; The Calculation Model—Ch. 15, Professional Microsoft SQL Server Analysis Services 2008 with MDX, Wrox Press: Birmingham, UK. Mar. 2009.*

Schindler; B et al, Multiverse Data-Flow Control, Jun. 2013, IEEE, Transactions on Visualization and Computer Graphics, vol. 19, No. 6. pp. 1005-1018. (Year: 2013).*

Yu; B, Silva; C.T., VisFlow—Web-based Visualization Framework for Tbaular Data with a Subset Flow Model, pub. orig. Aug. 15, 2016, IEEE, Transactions on Visualization and Computer Graphics, vol. 23, No. 1. (Year: 2016).*

"Transforming Data Using SAP HANA Application Function Modeler," Retrieved from http://help.sap.com/saphelp_hanaplatform/helpdata/en/29/de6754ef9646999b6261819bd802cb/content.htm, pp. 1-28, 2014.

Singh, Angad, "Using Application Function Modeler to Create Forecast (APL) Procedure in SAP HANA," Retrieved from http://www.bizintelligence.com.au/2015/06/using-application-function-modeler-to.html, pp. 1-10, on or before Jul. 20, 2016.

"Logical data model," Retrieved from https://en.wikipedia.org/wiki/Logical_data_model, pp. 1-3, on or before Jul. 26, 2016.

"Administration and Development Environment for SAP HANA," *SAP HANA Studio—Overview*. Retrieved from http://scn.sap.com/servlet/JiveServlet/download/60363-2-371615/SAP_HANA_Studio_Overview, 31 pages, 2012.

"Editing the flowgraph container," Retrieved from http://help.sap.com/saphelp_hanaplatform/helpdata/en/27/f55dc0b6c74a65b66bdc4693944985/content.htm, pp. 1-2, on or before Jul. 27, 2016.

"Editing an anchor," Retrieved from http://help.sap.com/saphelp_hanaplatform/helpdata/en/45/aa57dc82aa43f7aff2adcae99dcf94/content.htm, pp. 1-2, on or before Jul. 27, 2016.

"Flowgraphs," Retrieved from http://help.sap.com/saphelp_hanaplatform/helpdata/en/93/b3e3191ae34508a4d92dff9b6d350c/content.htm, pp. 1-3, on or before Jul. 27, 2016.

"Viewing Options for Tables and Views," Retrieved from https://help.sap.com/saphelp_hanaplatform/helpdata/en/74/bfc98a85df497f8c9683f5e7cd59ff/content.htm, pp. 1-4, on or before Jul. 27, 2016.

"Add a Variable to the Container Node," Retrieved from http://help.sap.com/saphelp_hanaplatform/helpdata/en/85/f510efd2fd4f9baffa91a8b85731ad/content.htm, pp. 1-2, on or before Jul. 27, 2016.

Farber et al., "The SAP HANA Database—An Architecture Overview," *IEEE Data Eng. Bull.*, 35(1): 28-33, 2012.

* cited by examiner

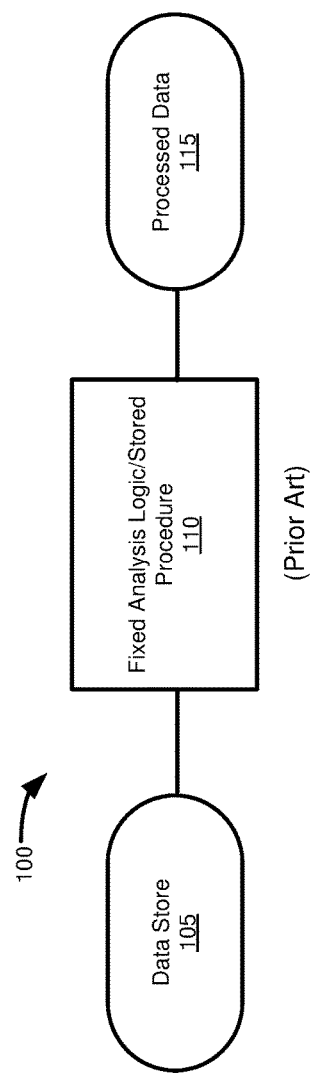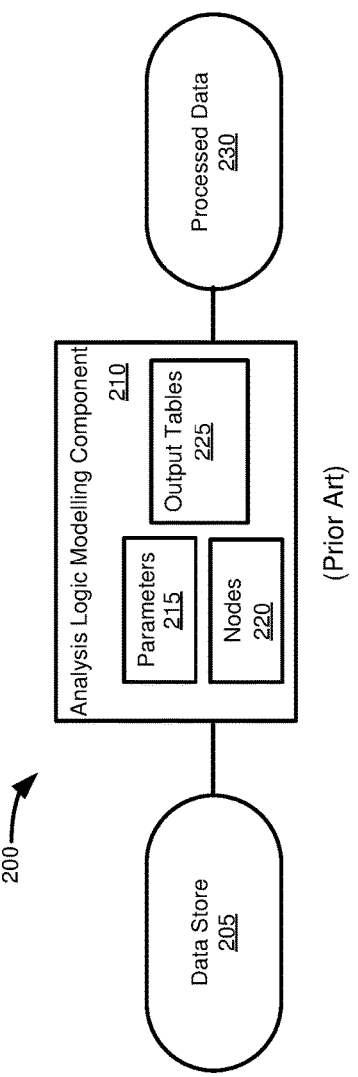
FIG. 1 (Prior Art)
FIG. 2 (Prior Art)

DATA FLOW MODELING AND EXECUTION

BACKGROUND

Advances in computing technology enable ever increasing amounts of data to be collected and analyzed. However, retrieving and analyzing data can be complex. In many cases, the ultimate consumer of information may not have the technical skill required to either determine how data should be processed for a particular purpose or to implement the analysis in a particular software environment.

Accordingly, there remains room for improvement.

SUMMARY

The Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

An embodiment can be implemented as one or more computer-readable media comprising computer-executable instructions that when executed cause a computing system to perform processing to generate execution results of a data processing procedure, the processing comprising retrieving data associated with each of a plurality of nodes in the data processing procedure, each of the nodes comprising a node identifier; calculating the data union of the plurality of nodes; and collecting the data union in an output table, the output table comprising a node identifier column; wherein each row of the output table that comprises node data is associated with the node identifier of the node from which the node data originated.

An embodiment can be implemented as a system comprising memory; one or more hardware processors coupled to the memory; and one or more computer-readable media storing instructions that, when loaded into the memory, cause the one or more hardware processors to perform operations for, based on user input; defining a data flow, the data flow comprising a plurality of nodes and a single data output; associating the plurality of nodes with a union node, the single data output associated with the union node; and defining an output table based on the union node.

An embodiment can be implemented as a method implemented at least in part by a computing system, the method comprising retrieving data associated with each of a plurality of nodes in a data processing procedure, each of the nodes associated with node data and comprising a node identifier stored in node metadata associated with each of the nodes; collecting the node data in an output table, the output table comprising a node identifier column; wherein each row of the output table that comprises node data is associated, using the node metadata, with the node identifier of the node from which the node data originated.

As described herein, a variety of other features and advantages can be incorporated into the technologies as desired.

BRIEF DESCRIPTION OF THE DRAWINGS

FIG. 1 is a block diagram of system configured to produce processed data by applying a fixed analysis logic to data of a data store.

FIG. 2 is a block diagram of system configured to produce processed data by using an analysis logic modeling component having multiple output tables to process data associated with a data store.

DETAILED DESCRIPTION

Example 1—Example Overview

Figure 3:
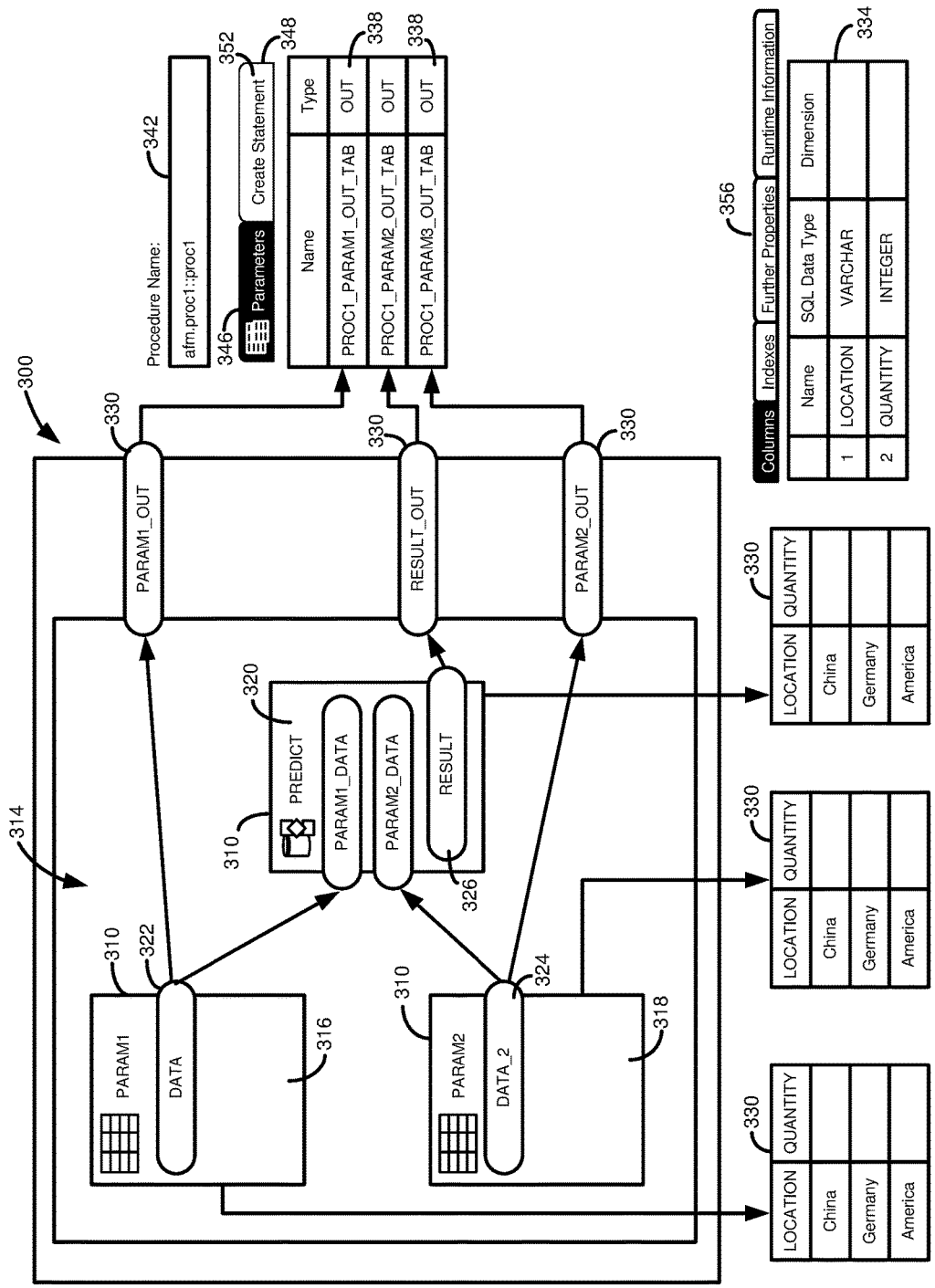
FIG. 3 is a schematic diagram of a data flow, and associated features, modeled using the system of FIG. 3.

Advances in computing technology enable ever increasing amounts of data to be collected and analyzed. However, retrieving and analyzing data can be complex. In many cases, the ultimate consumer of information may not have the technical skill required to either determine how data should be processed for a particular purpose or to implement the analysis in a particular software environment.

An analysis logic used to analyze data can include a mathematical model and a use model that relates mathematical elements to the context in which the data is used. Implementing a new analysis logic, or in at least some cases, implementing an analysis logic in a new computing system, may require collaboration by multiple people having different skill sets. For example, an end user may need to discuss the purpose of the data acquisition/analysis with a data scientist. The data scientist can determine what data is needed, and how it should be manipulated, to best meet the user's needs. However, the data scientist may lack the technical skills needed to implement the analysis logic in a particular computing system. For example, it may be necessary to modify existing code, or create new code, in order to implement the analysis logic. Thus, the data scientist, and possibly the end user, may need to involve a software developer or software development team in order implement the analysis logic.

The above-described paradigm can have several drawbacks. For example, the involvement of multiple parties can increase the time and cost of implementing a new analysis logic. The involvement of multiple parties can also increase the risk of miscommunication, which may result in an outcome that does not produce the optimal results for the end user, or which requires additional time and resources to correct.

Even when a suitable analysis logic has been created and implemented, problems can still arise. For example, users, such as new users, may be unclear as to what is involved in a particular analysis logic. That is, the methodology underlying the analysis logic may be a black box. Without a firm understanding of the inputs, processing, and outputs of the analysis logic, a user may not be able to use, or optimally use, the analysis logic. Additionally, if the inputs and intermediate results are not made available to the user, the user may be missing information that could be helpful in decision making.

The analysis logic may also be difficult to modify. If the desired use, or underlying data sources, should change, the analysis logic may need to be completely re-implemented, or require significant efforts to reconfigure or adapt. In view of the potential time and costs involved, it may be difficult to make changes to an established analysis logic.

When an analysis logic is included as part of a software application, the analysis logic may be the only analysis logic used in the application (or, the only analysis logic of that type provided by the application). Thus, the user may have limited analysis options. On the other hand, if multiple types of analysis logic are provided, a user may be confused as to which analysis logic should be used for a particular purpose, and may select a suboptimal or inappropriate analysis logic, or may simply avoid using any analysis logic.

The present disclosure can provide embodiments that may reduce or eliminate these problems. For example, disclosed embodiments can facilitate the creation or modification of an analysis logic, such as by modeling the analysis logic as a data flow that can be converted to an executable software object. Thus, it may be sufficient for an end user to consult with a data scientist in order to develop or modify an analysis logic. The present disclosure can also facilitate the implementation of the analysis logic, such that it may not be necessary to require the involvement of software developers. In at least some cases, the end user may be able to directly determine and implement a desired analysis logic.

The present disclosure can enable a user to select, or switch between, multiple analysis logics. The user can be provided with a description of each analysis logic, including a description of the inputs, outputs, operations, and intermediate values associated with each analysis logic. In at least some aspects, the data analysis can be presented to a user in a graphical manner, including in an interactive manner. Thus, the user can be empowered to select the optimal analysis logic, and to make the best use of it.

Example 2—Example Data Processing with Fixed Analysis Logic

FIG. 1 is a block diagram of a prior art system 100 implementing an analysis logic. The system 100 includes a data store 105. A fixed analysis logic/stored procedure 110 access data of the data store 105 to produce processed data 115.

As shown in FIG. 1, and as described above, the fixed analysis logic 110 can be problematic for a number of reasons. For example, a user may not be provided with information regarding the operations associated with the analysis logic. The prior art system 100 can be disadvantageous because it may be limited to the single fixed analysis logic 110. Along with providing the user with fewer analysis options, the fixed analysis logic 110 may be difficult to replace or modify.

Example 3—Example Data Processing with Multiple Output Tables and Tight Coupling FIG. 2 is a block diagram of a prior art system 200 that can allow for the creation and use of one or more analysis logics. The system 200 can include a data store 205. In a specific example, the data store 205 can be the HANA database system of SAP SE of Walldorf, Germany. The data store 205 can be in communication with an analysis logic modeling component 210 (e.g., the Application Function Modeler component of the HANA STUDIO integrated development environment of SAP SE of Walldorf, Germany).

The analysis logic modeling component 210 can model an analysis logic as a data flow. The data flow can include one or more parameters 215. Each parameter 215 can be associated with a node 220 of the data flow. Nodes 220 may serve various functions. For example, some nodes 220 (i.e., provider nodes) may provide data to be retrieved or operated on. Other nodes 220 (i.e., operator nodes) may operate on data provided by provider nodes, or which are produced by another operator node. Operator nodes can, for instance, perform mathematical operations on data, filter data, or combine data in various manners (such as performing structured query language (SQL) operations, just as UNION and JOIN operations).

Each node 220 can be associated with an output table 225. For provider nodes 220, a corresponding output table 225 can represent data associated with the provider node. For an operator node 220, the output table 225 can represent the results (output) of performing the operations associated with the operator node on the input to the operator node (such as data from one or more provider nodes or other operator nodes). The output tables 225 can be queried (including being combined) to produce processed data 230.

The system 200 can provide some advantages over the system 100. For example, as an analysis logic can be constructed from the nodes 220, it can facilitate the creation or modification of an analysis logic. That is, individual nodes 220 can be constructed and linked together. The nodes 220 can be integrated into a software application, such as an integrated development environment, so that data and operations associated with the nodes 220 can be implemented without the need to write or modify code for the software application.

However, the system 200 can still have some drawbacks. For example, the system 200 can require tight correspondence between the parameters 215, their associate nodes 220, and the output tables of the nodes 225. For example, the modeling component 210 can use a specific naming convention in order to match corresponding parameters 215, nodes 220, and output tables 225 in a particular data flow. This can introduce tight coupling into the system 200, which can make it difficult to port an analysis logic to a different computer system (which may have a different naming convention). The use of specific naming conventions can also make it more difficult for users, particularly less technically sophisticated users, to create or modify analysis logics, as they may need to be familiar with a naming convention, which may not be obvious or intuitive, in order for the data analysis to be created and execute properly. Inconsistencies in the number of output nodes may also require a SQL statement calling the analysis logic to be constructed dynamically, rather than being hard coded. Dynamic SQL statements can be subject to security issues (such as SQL injection) and performance issues. Finally, the use of multiple output tables can complicate subsequent data manipulation, as it can require many different output tables 225 to be accessed.

Example 4—Example Data Flow Having Multiple Nodes with Output Tables

FIG. 3 is a diagram of an example screen 300 that can be used to create, edit, or execute an analysis logic, such as represented by a data flow, according to the prior art system 200 of FIG. 2. The screen 300 includes a display of a plurality of nodes 310 representing elements of a data flow 314. Each of the nodes 310 can be bound to a runtime object, such as a procedure, a view, or a table.

The nodes 310 can include provider nodes 316, 318 that provide data to be included in the data flow 314, such as being manipulated by an operator node 320, or included in the output of the data flow 314. For example, provider node 316 is associated with data 322 for a parameter PARAM1. Provider node 318 is associated with data 324 for a parameter PARAM2. The data 322, 324 serves as input for the operator node 320. The operator node 320 operates on the data 322, 324 to provide a result 326.

Each of the nodes 310 can be associated with an output table 330 of the data flow 314. The format of the output tables 330 can be defined, and populated when the data flow 314 is executed. By way of example, the output tables 330 represented in the data flow 314 can have the format of table 334. In this specific example, the table 334 includes values for a quantity of a particular information element (which could be units of stock, sales, and the like) for each of a plurality of geographic locations. Of course, the table 334 could be structured in another manner, including having more or fewer rows or columns and representing information elements other than, or in addition to, those shown.

The output tables 330 can be associated with procedure parameters 338 for a procedure 342 associated with the data flow 314, which a user can view by selecting a parameters tab 346 of an analysis user interface element 348. By selecting the create statement tab 352 of the analysis user interface element 348, the user can define query operations (e.g., SQL statements) to retrieve or manipulate information associated with the parameters 338. Using a table definition user interface element 356, a user can define a table to hold the results of the query operations defined using the analysis user interface element 348. For example, the user can associate table columns with a name, a data type, and particular query result elements.

When the procedure 342 is executed, each parameter 338 is identified. The procedure parameters 338 are mapped to a corresponding output table 330. Typically, the mapping is accomplished using a standardized naming convention. For example, as shown in FIG. 3, the procedure parameter 338 associated with PARAM1 is named PROC1_PARAM1_OUT_TAB. The output table 530 for PARAM1 is entitled PARAM1_OUT. The node 310 associated with PARAM1_OUT is named PARAM1. Thus, for a particular procedure parameter 338, the corresponding output table 330 can be identified by removing the procedure name from the beginning of the procedure parameter 338 identifier and removing_TAB from the end of the procedure parameter identifier. The node 310 corresponding to the output table 338 of the procedure parameter 338 can be identified by removing_OUT from the name of the output table 330.

The use of a specific naming convention, or other specific mapping arrangement, can be problematic. For example, it may be difficult for a procedure 342 to be used in another application (including the same application accessed by a different user), as there may be a mismatch between the names of the procedure parameters 338 and the names of the nodes 310 or output tables 330. Similarly, a tightly coupled mapping arrangement can make a procedure 342 more difficult to create or modify, as a user would need to be aware of the required mapping and/or naming conventions.

Another potential issue with the data flow 314 arrangement shown in FIG. 3 is that each procedure 342 can have a different signature. For example, different procedures 342 can have different numbers of output tables 330, arising from having different numbers of nodes 310. Thus, it may be necessary to dynamically construct the query operations used with the procedure 342. As explained in Example 3, dynamically constructed SQL statements can be associated with security issues (e.g., SQL injection) and reduced performance.

Example 5—Example Data Processing with Node Metadata and Single Output Table

Figure 4:
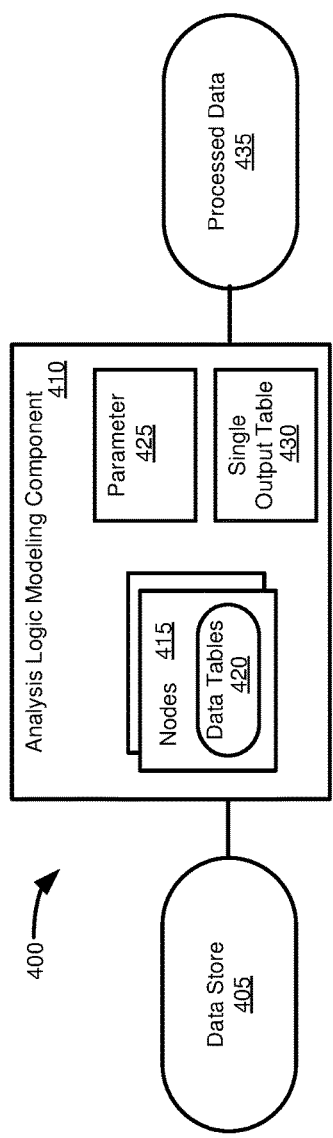
FIG. 4 is a block diagram of system configured to produce processed data by using an analysis logic modeling component having a single output table to process data associated with a data store, according to an embodiment of the present disclosure.

FIG. 4 is a block diagram of a system 400 according to an embodiment of the present disclosure that can allow for the improved creation and use of one or more analysis logics. The system 400 can include a data store 405. In a specific example, the data store 405 can be the HANA database system of SAP SE of Walldorf, Germany. The data store 405 can be in communication with an analysis logic modeling component 410 (e.g., the Application Function Modeler component of the HANA STUDIO integrated development environment of SAP SE of Walldorf, Germany).

The analysis logic modeling component 410 can model an analysis logic as a data flow that includes one or more nodes 415. Like the nodes 220 of FIG. 2, the nodes 415 may serve various functions. For examples, some nodes 415 (i.e., provider nodes) may provide data to be collected or operated on. Other nodes 415 (i.e., operator nodes) may operate on data provided by provider nodes (or other operator nodes), which can then be subject to further operations, or output. For example, operator nodes can perform mathematical operations on data, can filter data, or can combine data in various manners (such as performing structured query language (SQL) operations, such as UNION and JOIN operations).

Each node 415 can be associated with one or more data tables 420. The data tables 420 can include various information about the node 415, including data or other nodes associated with the node. The data tables 420 can include a node identifier associated with the node 415. The data tables 420 can also include navigation information associated with a node 415. Navigation information can include a view to be displayed when a user selects a particular navigation action associated with a particular node 415. For example, when viewing data associated with a particular node 415, selecting a navigation action may call a display that provides additional information and context regarding the node. In a particular implementation, a node 415 can be represented by a data table 420 including:

| Key | Value |
| --- | --- |
| nodeID | The value of the nodeID field for the data table of the specified node. For each node, there can be only one associated data table. |
| navigationType | Specifies the navigation type |

In other aspects, rather than being stored in a table, information associated with the node 415, including a node identifier, can be stored in another type of data structure.

A particular data flow of the analysis logic modeling component 410 can include a single parameter 425 associated with a single output table 430. The output table 430 can be defined and populated using the node identifiers and data associated with the data tables 420 of the nodes 415. For example, an output table 430 can have the following structure:

| Column | Column Data Type | Description |
| --- | --- | --- |
| NODE_ID | NVARCHAR(32) | Value used to describe node contents in output table |
| Other columns | | Data associated with node data columns, which can be used as part of the logic analysis |

The parameter 425 associated with the output table 430 can be used to obtain processed data 435. In particular implementations, a node 415 can be a union node, collecting data from all the other nodes of the data flow. The output table 430 can be constructed from the union node 415.

The processed data 435 can include all or a portion of the data of the output table 430. In some cases, the processed data 435 can be filtered or queried, such as by node identifier, or particular data types associated with the data tables 420 of the nodes 415.

The system 400 can provide a number of advantages. For example, by storing the node identifiers in the data tables 420 for the nodes 415, the output table 430 can include data from a node without directly referencing the name of the node. This can decouple the node name from the output table 430. Accordingly, the system 400 can provide more flexibility in constructing a data flow.

By providing a single output table 430, the system 400 can also make it easier to produce processed data 435 from the output table 430. The single output table 430 can also make it easier to modify the data flow, as there may be less interdependency between the nodes 415, and a single output table 430, rather than the multiple output tables 225 of the system 200 of FIG. 2. Because each data flow includes a single output table 430, static, rather than dynamic, query operations (e.g., SQL statements) can be used, which can improve processing speed and reduce potential security concerns.

Example 6—Example Data Flow Processing with Single Output Table

Figure 5:
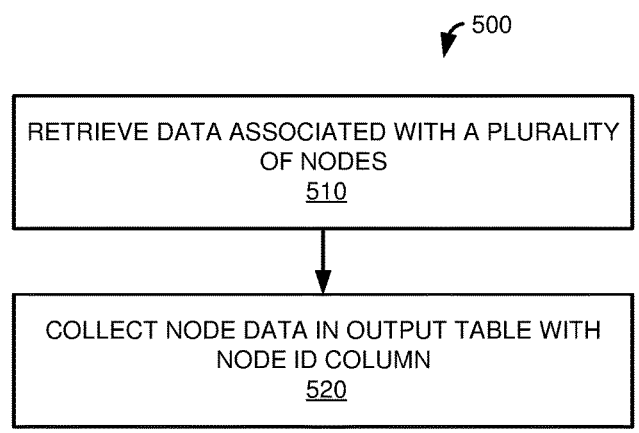
FIG. 5 is a flowchart of an example method of executing a data processing procedure according to an embodiment of the present disclosure.

FIG. 5 is a flowchart of an example method 500 of processing a data flow, such as a data flow configured as described in Example 5 having node metadata and a single output table.

At 510, data associated with each of a plurality of nodes in a data processing procedure (e.g., a data flow) is retrieved. Each of the nodes is associated with node data and includes a node identifier stored in node metadata. At 520, the node data is collected in an output table that includes a node identifier column.

Example 7—Example Data Flow Processing with Union Node

Figure 6:
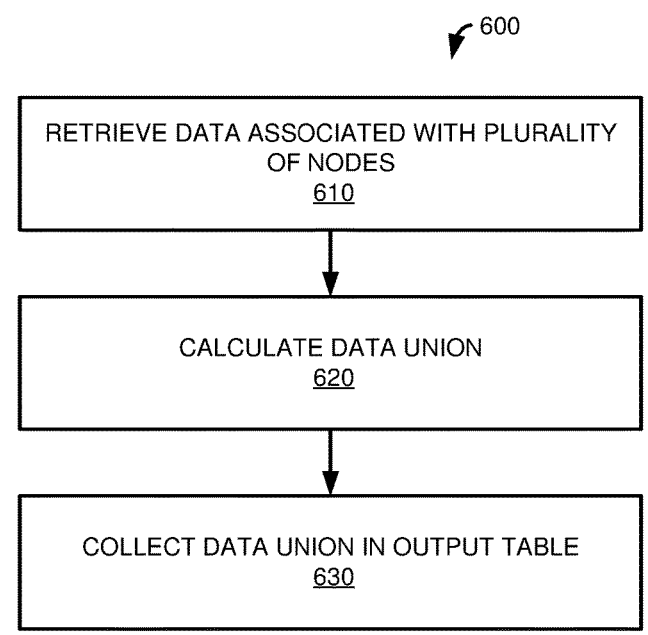
FIG. 6 is a flowchart of an example method of executing a data processing procedure according to an embodiment of the present disclosure.

FIG. 6 is a flowchart of an example method 600 of processing a data flow, such as a data flow configured as described in Example 5 having node metadata and a single output table. The method 600 can be carried out using the system 400 of FIG. 4, such as using the analysis logic modeling component 410, and so the method is described with reference to the system. However, in other cases, the method 600 can be carried out on a different system than the system 400.

At 610, data associated with a plurality of nodes 415 of the data flow is retrieved, such as from the data store 405 of FIG. 4. Each of the nodes 415 can be associated with a node identifier. For example, the node identifier can be stored in node metadata for the node. In 620, the data union is calculated for the plurality of nodes 415, such as using data in the data tables 420 associated with the plurality of node. The data union is collected in the single output table 430 at 630.

The output table 430 can include a node identifier column. Each row of the output table 430 that includes node data is associated with a node identifier of the node 415 from which the node data originated. For example, the node identifier can be provided by the node identifier column entry for a row of the output table 430.

In at least some implementations, a parameter 425 of the data flow can be mapped to the single output table 430. In more particular implementations, the parameter 425 can be the sole parameter (such as a parameter associated with the output of the data flow) of the data flow.

Figure 7:
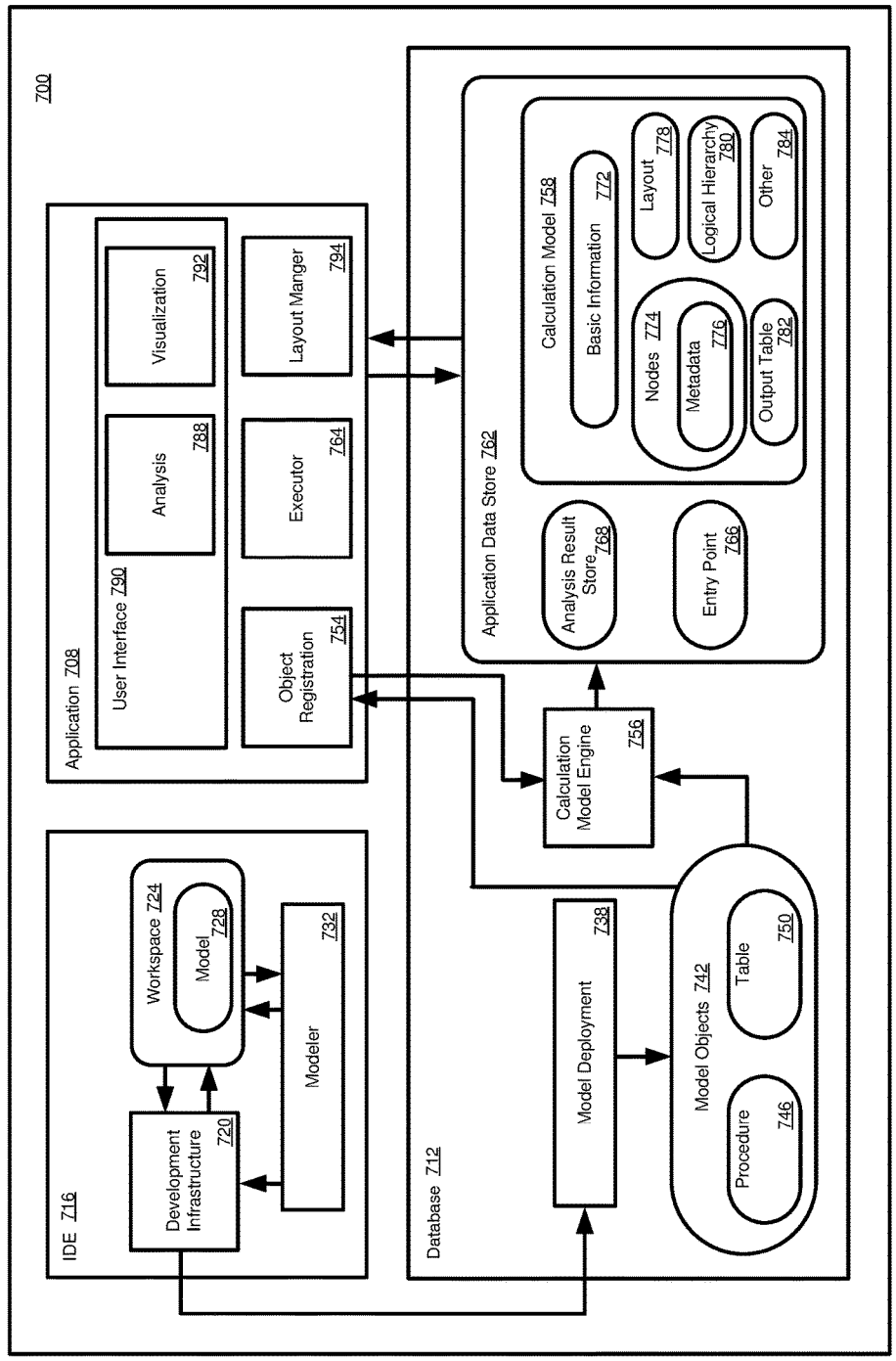
FIG. 7 is a block diagram of an example software architecture for implementing the system of FIG. 4.

Example 8—Example Data Processing System with Node Metadata and Single Output Table FIG. 7 is a block diagram of an example software architecture 700 configured to provide for the creation and execution of an analysis logic using node metadata and a single output table, such as described in Example 5. The software architecture 700 can include an application 708 that is in communication with a database system 712. The database system 712 can be, for example, the HANA database system of SAP SE of Walldorf, Germany. The database system 712 can be in communication with an integrated development environment (IDE) 716, such as the HANA STUDIO integrated development environment of SAP SE of Walldorf, Germany.

The application 708 can allow a user, such as an end user, to select and execute an analysis logic stored in the database system 712, and using data stored in the database system. A user can create or modify an analysis logic using the IDE 716. The logic analysis can then be stored in the database system 712 to be accessed by the application 708. In some cases, the user of the IDE 716 can be a data scientist or a data analyst. In other cases, the user of the IDE 716 can be an end user, such as a user (or class of user) of the application 708. In other implementations, the user of the IDE 716 can be a different type of user (e.g., a developer).

Although FIG. 7 illustrates a specific system 700 having an application 708, a database system 712, and an IDE 716, embodiments of the present disclosure can be implemented in other manners. For example, rather than having an IDE 716, the architecture 700 can include all or a portion of the functionality of the IDE in another component, such as in the database 712 or the application 708, for creating or modifying an analysis logic. In addition, in some cases, functionality of the application 708 and the database 712 can be combined.

The IDE 716 can include a development infrastructure 720. The development infrastructure 720 can provide development tools that provide, among other possible functions, for the creation and modification of a data flow representing an analysis logic. For example, the development infrastructure 720 can provide user interface components that allow a data flow model to be created and then registered and activated as a run-time object within the database 712, such as for use by the application 708. The development infrastructure can also provide repository services, including cataloguing and providing access to content (e.g., data flows representing analysis logics), versioning, synchronization, and integration of logical models. The development infrastructure 720 can provide functions for retrieving and processing data from the database 712.

The development infrastructure 720 can manage a workspace 724 that a user can use to build a model 728, such as a data flow, of an analysis logic. The workspace 724 and the development infrastructure 720 can access a modeler component 732. The modeler component 732 can provide functionality for defining a data flow, such as defining the data to be included in the data flow, manipulation of the data during the data flow, outputs of the data flow, and defining further manipulation of the outputs, such as filtering or formatting the outputs to provide different reports or views of the data. In a specific example, the modeler component 732 is the Application Function Modeler component of the HANA STUDIO integrated development environment of SAP SE of Walldorf, Germany.

The development infrastructure 720 of the IDE 716 can cooperate with a model deployment component 738 of the database 712. The model deployment component 738 can manage model objects 742. For example, the model deployment component 738 can convert a data flow created using the modeler 732 into a stored procedure 746. In particular examples, a stored procedure 746 can be in the SQLScript format. The stored procedures 746 can be versions of the data flow executable by the database 712, or which can be converted into other formats, such as formats useable by the application 708.

Information regarding the data flow can be stored in a table 750 associated with the stored procedure 746 associated with the data flow. For example, the table 750 can include information from the data tables 420 of the nodes 415 of FIG. 4, including annotation information such as node identifiers and navigation information.

Stored model objects 742 (e.g., a stored procedure 746 and its associated table 750) can be accessed by the application 708. For example, the application 708 can include an object registration component 754. The object registration component 754 can select stored model objects 742 to be processed for use by the application 708. For instance, the objection registration component 754 can request that a calculation model engine 756 (which can be part of the database system 712) convert a model object 742 to a calculation model 758 that can be stored in an application data store 762 for the application 708 in the database system 712. For model objects 742 available to the object registration component 754, the object registration component can maintain a name (and/or other identifier associated with a particular data flow) and a description of the data flow associated with the model object.

The application 708 can include an executor component 764. When the application 708 is to execute a calculation model 758, such in response to a user request, the executor component 764 can locate the entry point 766 for the calculation model in the application data store 762 and cause it to be executed. The entry point 766 can be, in some aspects, a container node that includes the nodes 774 for the calculation model. In at least some cases, execution can be carried out at least partially by the database 712, which can improve processing speed and reduce resource consumption at the application 708. The execution results can be returned to the executor component 764 for further use by the application 708, and stored (optionally as modified by the application 708) in an analysis result store 768 of the application data store 762.

The calculation model 758 can be structured as a plurality of nodes 774, such as described above in Example 5. The nodes 774 can be associated with metadata 776, such as a node identifier. The relationship of the nodes 774 to one another can be stored in a layout 778. For example, the layout 778 can store information about which nodes 774 serve as input or output for another node. For operator nodes 774, the layout 778 can specify how data from provider nodes should be used.

The calculation model 758 can be structured as a plurality of notes 774, such as described above in Example 5. The nodes 774 can be associated with metadata 776, such as a node identifier. The relationship of the nodes 774 to one another can be stored in a layout 778. For example, the layout 778 can store information about which nodes 774 serve as input or output for another node. For operator nodes 774, the layout 788 can specify how data from provider nodes should be used.

A calculation model 758 can be structured as a package containing a plurality of files or objects. The package can be structured as a logical hierarchy, which can be stored in a logical hierarchy store 780. As will be explained in more detail, the results of the calculation model 758 can be expressed as an output table 782 that can be defined in the calculation model. The calculation model 758 can include other information 784.

Execution results received by the executor component 764 can be provided to an analysis component 788 of a user interface 790 of the application 708. The analysis component 788 can, for example, allow a user to view or manipulate the execution results. For instance, the analysis component 788 can allow a user to subject the execution results to further processing, to select particular elements of the execution results for viewing (or further manipulation), or to specify a format in which to view all or a portion of the execution results. In at least some cases, changes made to the execution results, or further information provided using the execution results, can be stored in the analysis result store 768 of the application data store 762.

The user interface 790 can include a visualization component 792. The visualization component 792 can provide a graphical display, including an interactive graphical display, of all or a portion of the execution results. The visualization component 792 can be in communication with a layout manager 794, which can include various predefined view templates for visualizing execution results. The visualization component 792 can provide a user with tools to select, create, or modify visualizations, which can then be stored in the layout manager 794.

Although various components are shown in separate boxes, in practice, component boundaries may vary. In addition, particular components may be split into further subcomponents, and components, or portions thereof, may be combined. In practice, the systems shown and described in the present disclosure, such as the system 400 of FIG. 4, or the architecture 700, can be more complicated, with additional functionality, more inputs, outputs, and the like.

The architecture 700, and any of the other inventive systems or architectures described herein, can be implemented in conjunction with any of the hardware components described herein, such as the computing systems described below (e.g., comprising one or more hardware processors, computer-readable media coupled thereto, and the like). In any of the examples herein, data flow models, nodes, metadata, output tables, data visualizations, databases, and the like can be stored in one or more computer-readable storage media, machine-readable media, or computer-readable storage devices. The technologies described herein can be generic to the specifics of operating systems, browsers, or hardware and can be applied in any variety of environments to take advantage of the described features.

Example 9—Example Object Registration

Figure 8:
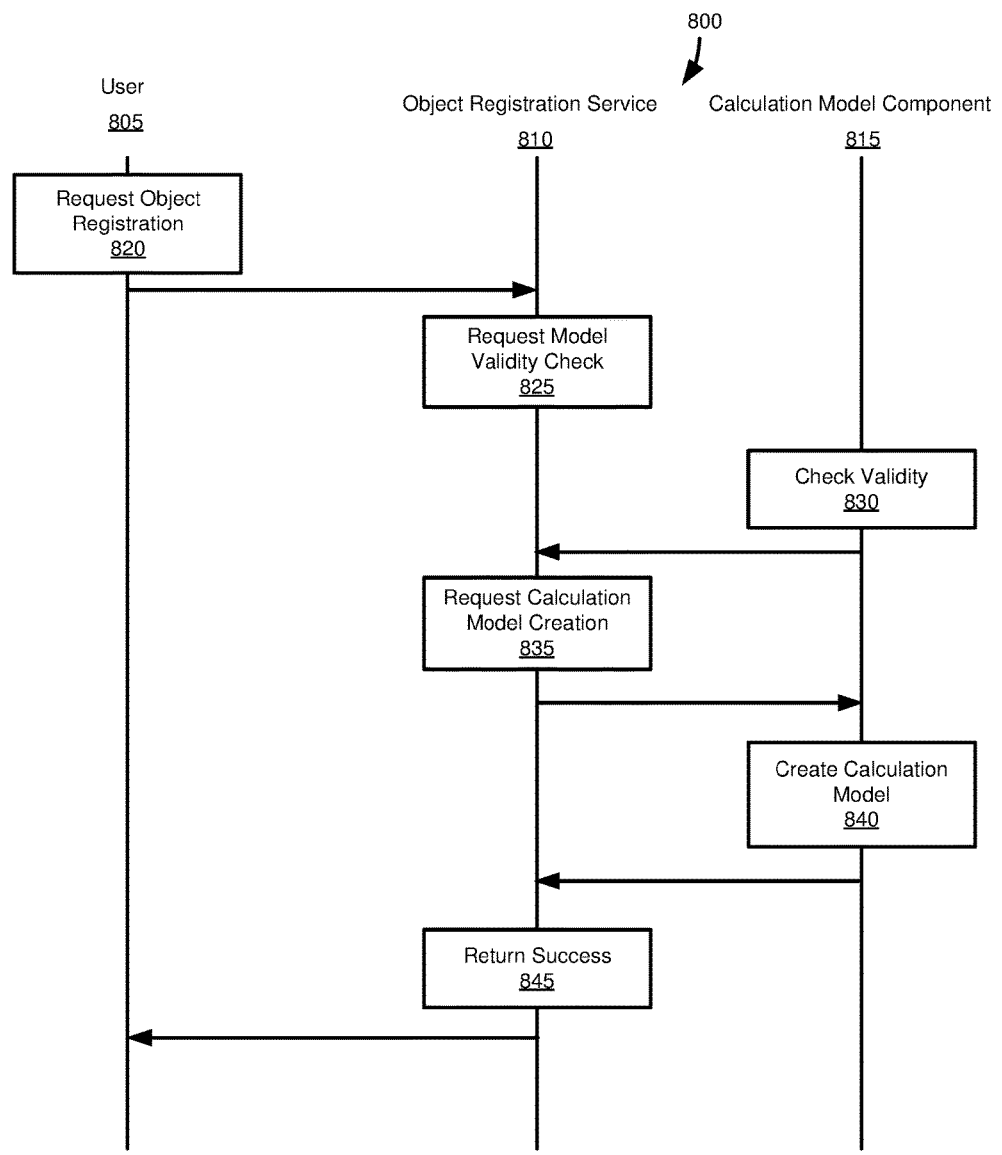
FIG. 8 is a flowchart of an example method of registering an object model of a data flow as a calculation model useable by a software application.

FIG. 8 is a flowchart of an example method 800 of registering a data flow, such as a data flow represented as a stored model object or procedure (e.g., in the model objects store 742 of FIG. 7) or as a calculation model for a software application, such as an application (e.g., the application 708). In specific cases, the method 800 can be implemented by the system 400 of FIG. 4 or the architecture 700 of FIG. 7.

The method 800 includes timelines for actions associated with a user 805, an object registration service 810 of a software application, and a calculation model component 815, which can be associated with the software application or another software component, such as the database). In a specific example, the calculation model component can be the calculation model engine 756 of FIG. 7.

At 820, a user (or, in some cases, a software component) requests that a data flow, such as represented in a model object, be registered for use with the software application. At 825, the object registration service 810 creates and sends a request to the calculation model component 815 to check the validity of the model object. The calculation model component, at 830, determines whether the model object is valid.

Determining whether a model object is valid can include determining whether the specified model object and its associated metadata table exist (e.g., the table 750 of FIG. 7). The metadata table can specify, for example, a location of the model object, an identifier for the model object at the location, a name, a path location for the model object within its location, or a database associated with the model object. The calculation model component 815 can also confirm that the data flow includes a single output table. The output table can be analyzed to determine that it matches a specification or configuration provided by the user (or the application).

In at least some cases, a data flow represented by the model object can be represented by a plurality of nodes maintained within a container node. As part of the validity check at 830, the calculation model component 815 can confirm that the name of the container node is not the same as the names of any of the data flow nodes. The calculation model component 830 may also determine whether the node identifiers of the nodes are unique. That is, each node identifier should be associated with a single, unique node.

If the model object is determined not to be valid, the method 800 can end, such as with an error message being returned to the user (not shown). If the model object is determined to be valid at 830, the object registration service 810 creates and sends a request to the calculation model component 815 to create a calculation model from the object at 835. The calculation model is created by the calculation model component 815 at 840. The object registration service 810 can make the calculation model available to the user at 845. The calculation model can be a version of the data flow that can be used by a database to provide data to the application.

The method 800 can provide various benefits. For example, the method 800 can make multiple analysis logics available to an application and/or an end user. In addition, as will be further described, the calculation model can be used to provide a representation of the data flow that can be displayed to a user, or used to manipulate data.

Figure 9:
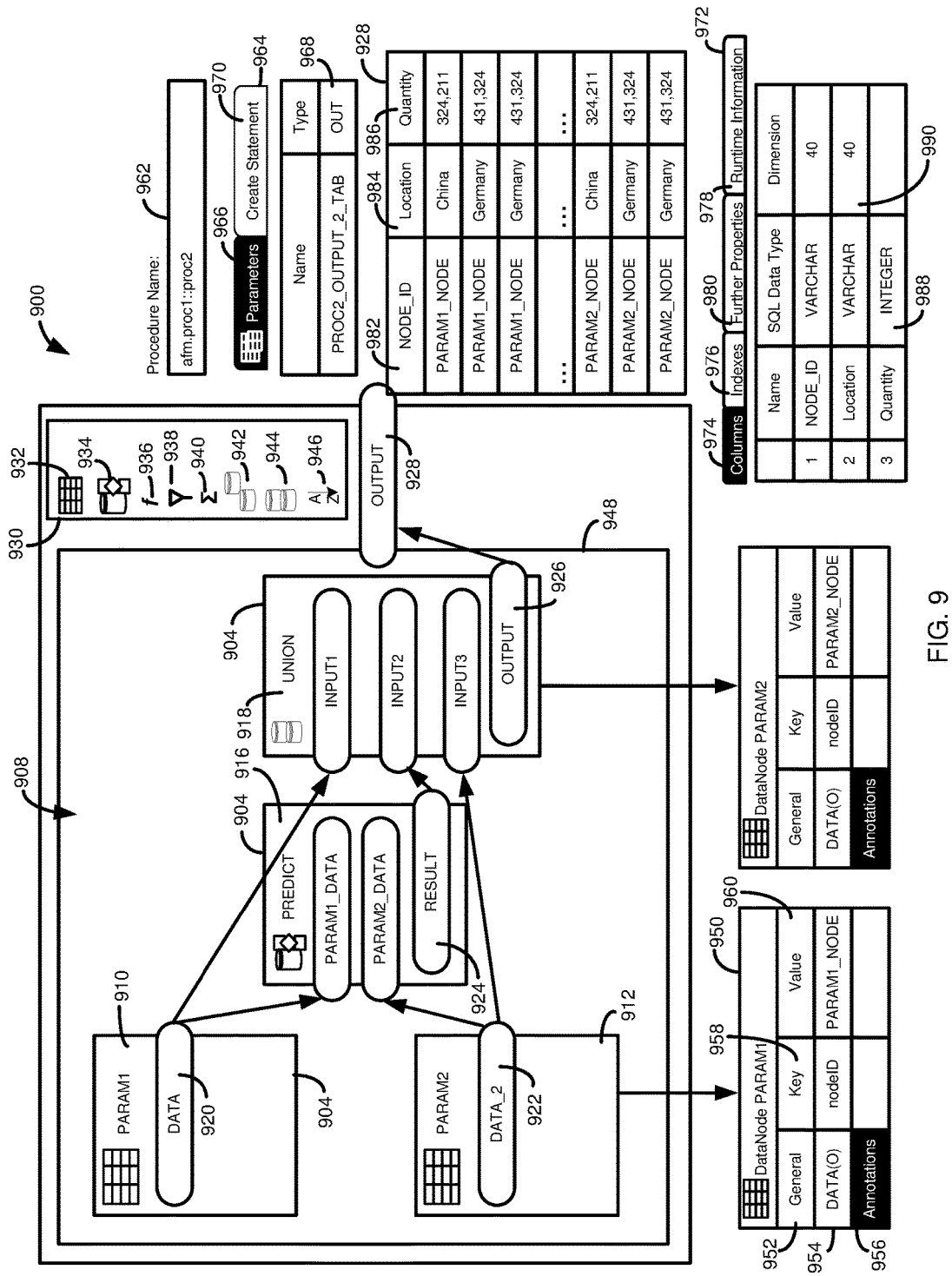
FIG. 9 is a schematic diagram of a data flow, and associated features, modeled using the system of FIG. 4.

Example 10—Example Data Flow with a Single Output Table and Nodes Having Node Metadata FIG. 9 is a diagram of an example screen 900 that can be used to create, edit, or execute an analysis logic, such as represented by a data flow, according to an embodiment of the present disclosure, such as using the system 400 of FIG. 4 or the architecture 700 of FIG. 7. The screen 900 includes a display of a plurality of nodes 904 representing elements of a data flow 908. Each of the nodes 904 can be bound to a runtime object, such as a procedure, a view, or a table. In some aspects, the workflow 908 can be a node that acts as a container for the nodes 904.

The nodes 904 can include provider nodes 910, 912 that provide data to be included in the data flow 908, such as being manipulated by an operator node 916 or included in the output of the data flow 908 through a union node 918. For example, provider node 910 is associated with data 920 for a parameter PARAM1. Provider node 912 is associated with data 922 for a parameter PARAM2. The data 920, 922 serve as input for the operator node 916. The operator node 916 operates on the data 920, 922 to provide a result 924. The result 924, and the data 920, 922, serve as input for the union node 918. The union node 918 produces an output 926 which also serves as the output 928 (such as in an output table) of the data flow 908.

FIG. 9 also illustrates a palette 930 that can be used to construct and edit the data flow 908. For example, the palette 930 can include icons for creating a new provider node 932, a procedure node 934, a function node 936 (such as a predefined/built-in function); a filter node 938, an aggregation node 940, a join node 942, a union node 944, or a sort node 946. In editing or creating a data flow 908, a user may select the desired icon from the palette 930 and drag it into a workspace 948 containing the data flow. The user may then set or edit the properties of the newly created node 904, and connect the node to one or more other nodes.

Each of the nodes 904 can be associated with various properties, which can be viewed and edited in a node container 950. As shown, the node container 950 includes a tab 952 where general properties of the node 904 can be viewed and edited, a tab 954 where data, such as a data table, associated with the node 904 can be viewed and edited, and an annotations tab 956, where annotations, including metadata, associated with the node can be viewed and edited.

The node container 950 is shown with the annotations tab 956 selected. The node container 950 displays a key column 958 and a value column 960. The container 950 is shown with a key of "nodeID" having a corresponding value of "PARAM1_NODE." Thus, PARAM1_NODE can serve as an identifier for the PARAM1 provider node 910.

The union node 918 serves to combine data from the other nodes 904 of the data flow 908 into a single output 926 and single output table 928. The output table 928 can be mapped to a procedure parameter for a procedure 962 using a procedure definition interface 964. The procedure definition interface 964 includes a parameters tab 966, which allows procedure parameters to be viewed, created, or modified. The procedure definition interface 964 shows a single procedure parameter 968, corresponding to the single output table 928. The procedure definition interface 964 also includes a create statement tab 970, which can allow query operations, such as SQL statements, to be specified for the procedure parameter 968.

The results of the query operations specified in the procedure definition interface 964 can be displayed in the output table 928 specified by an output container 972. The output container 972 can include a columns tab 974 allowing columns of the output table 928 to be specified. The output container 972 can include a tab 976 allowing tables indexes to be specified, a tab 978 providing access to runtime information (e.g., memory usage for the table, such as size in memory, size on disk, and number of records), and a tab 980 that displays other properties associated with the procedure output, including the output table 928.

As shown, the columns tab 974 of the output container 972 is selected. The output table 928 is shown as being defined with a node identifier column 982, a column 984 associated with data associated with the identifier "location," and a column 986 associated with data associated with the identifier "quantity." "Location" and "quantity" can be, for example, columns associated with the data tables of the nodes 904. Each of the columns 982, 984, 986 can be associated with a data type 988 (e.g., integer, double, Boolean, character array, etc.), and, optionally, a dimension (i.e., size, such as the number of characters in a character array data type) 990.

The output table 928 can be constructed using the definition provided by the output container 972. For example, the output table 928 can include columns corresponding to the columns defined in the columns tab 974 of the output container 972: node identifier, location, and quantity. Thus, the output table 928 collects all or a portion of the data from the nodes 904 into a single table, which can be queried or filtered using the node identifier corresponding to one or more nodes of interest. For example, data associated with PARAM1 can be obtained by selecting data with a node identifier of PARAM1_NODE.

This Example 10 can provide a number of benefits. For example, a data flow 908 can be constructed such that the final node 904 in the data flow is a union node 918 that produces an output table 928 which includes the data from all other nodes in the data flow. Because all of the data of the workflow 908 are included in the output table 928, the procedure 962 can include a single parameter 968 corresponding to the output table. As any data flow 908 will have a single output table 928, query statements (e.g., specified using the create statement tab 970) associated with the procedure 962 can be static, which can improve security and performance. In addition, a data flow 908 can be easily created or modified, as the node identifier for each node 904 is included in the metadata for the node (e.g., in the annotations 956).

Example 11—Example Data Flow Definition

Figure 10:
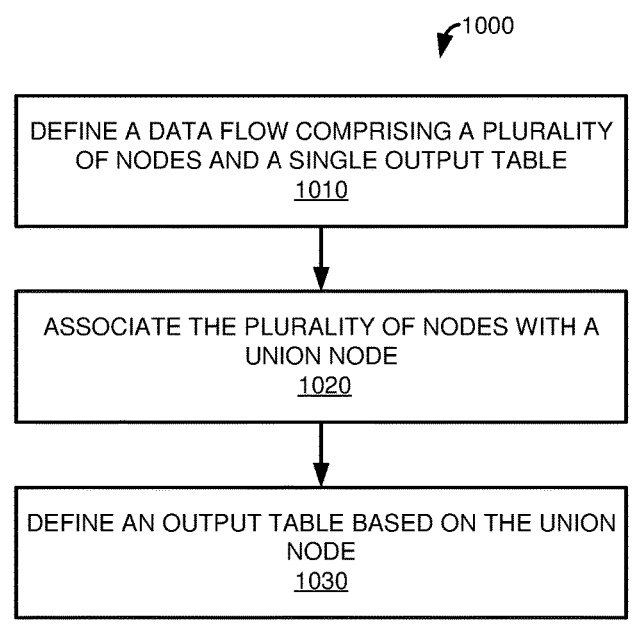
FIG. 10 is a flowchart of an example method of defining a data flow according to an embodiment of the present disclosure.

FIG. 10 is a flowchart of an example method 1000 of defining a data flow in response to user input. The data flow may be configured as described in Example 10 having node metadata and a single output table. The method 1000 can be carried out, for example, using the system 400 of FIG. 4 or the architecture 700 of FIG. 7.

At 1010, a data flow is defined that includes a plurality of nodes and a single data output. At 1020, the plurality of nodes are associated with a union node. The union node is associated with the single data output. An output table is defined at 1030 based on the union node.

Example 12—Example Data Processing

Figure 11A:
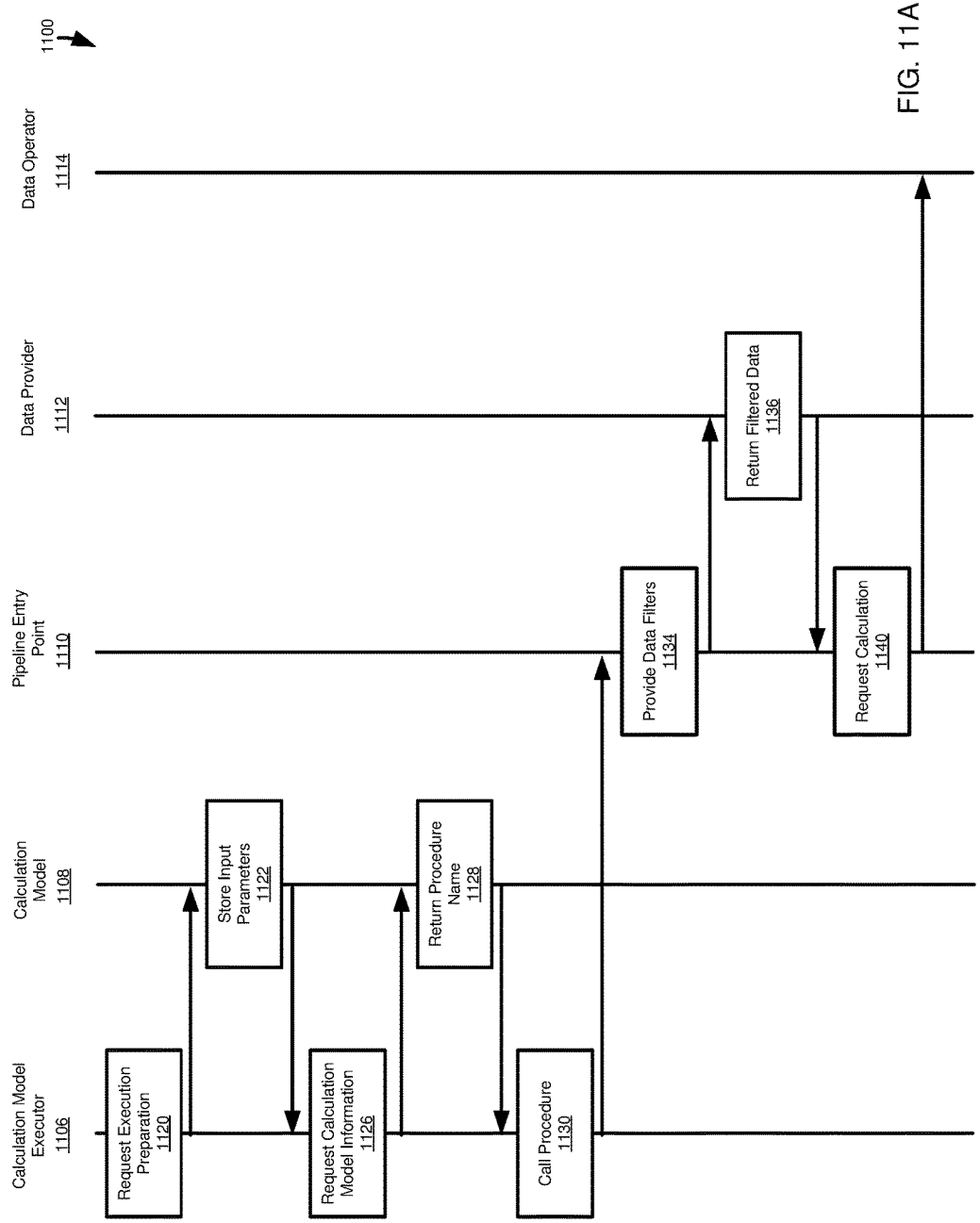
FIGS. 11A and 11B provide a flowchart of an example method of executing a calculation model implementing a data flow modeled according to the architecture of FIG. 7.
Figure 11B:
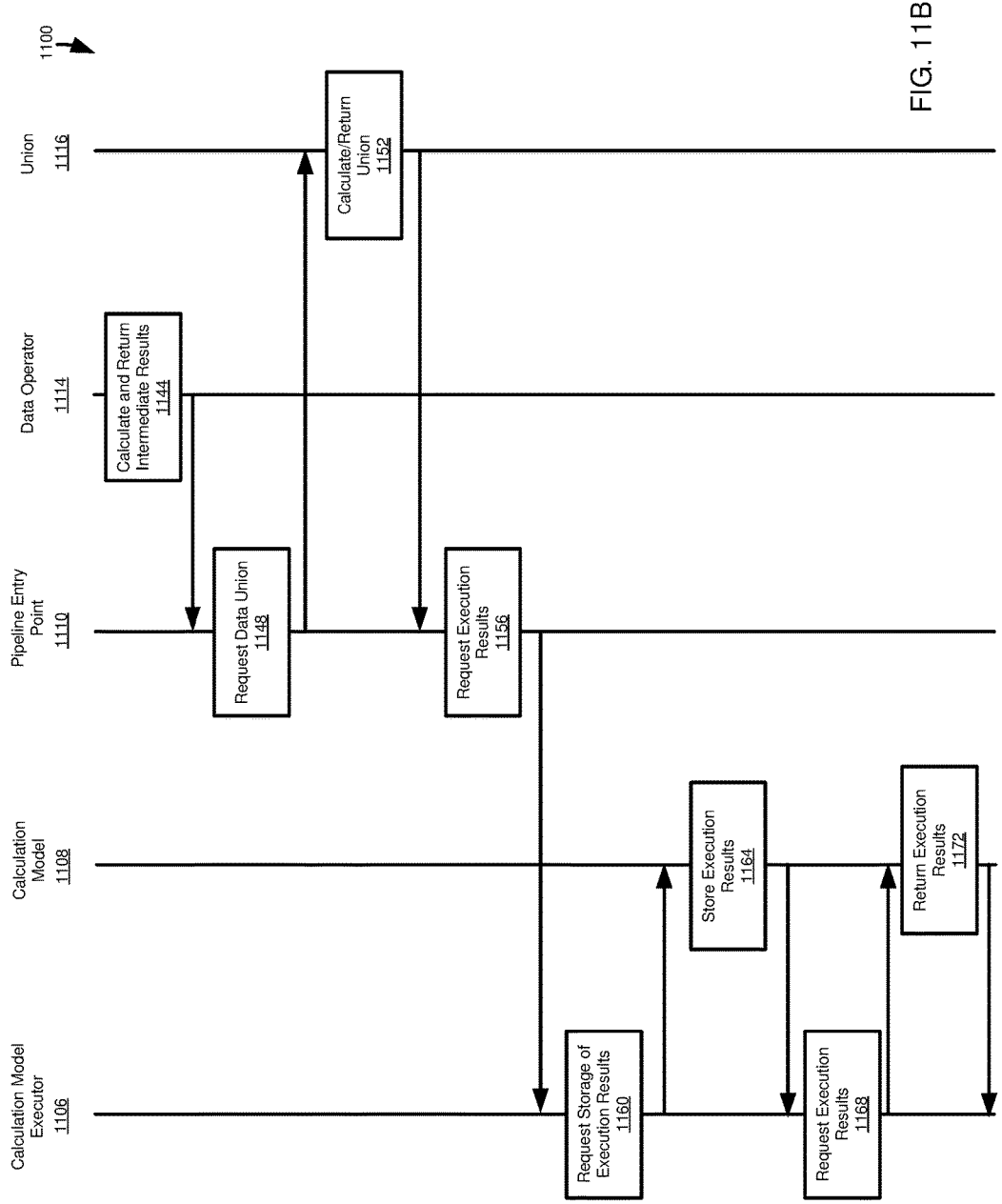

FIGS. 11A and 11B are flowcharts of an example method 1100 for executing a calculation model of a data flow representing an analysis logic. The method 1100 is carried out using a calculation model executor component 1106, a calculation model 1108, a stored entry point to the model (such as a container node for the nodes of the data flow), one or more data provider nodes 1112 (FIG. 11A), one or more data operator nodes 1114, and a union node 1116 (FIG. 11B). Although both a data provider node 1112 and a data operator node 1114 are shown, in some cases, the data flow may include only data provider nodes. The method 1100 can be carried out, for example, using the system 400 of FIG. 4 or the architecture 700 of FIG. 7.

With reference to FIG. 11A, at 1120, the calculation model executor 1106 requests that a calculation model be prepared for execution. The request may include input parameters that are used during execution of the calculation model, such as parameters to be used as data for the calculation, or parameters than can specify, for example, data to be included in the calculation or filter criteria to be applied.

The input parameters are stored by the calculation model 1108 at 1122. After 1122, the calculation model 1108 can return to the calculation model executor 1106 an indication of whether the input parameters were successfully stored. At 1126, the calculation model executor 1106 can request information associated with the calculation model, such as a stored procedure name. The calculation model 1108 can return the stored procedure name to the calculation model executor 1106 at 1128. At 1130, the calculation model executor 1106 can call the data pipeline entry point, such as the root node (or the container node) of the calculation model, in order to commence execution of the calculation model.

The pipeline entry point 1110, at 1134, can request that filters be applied to data supplied by the data provider node 1112. For example, the filters can include information from the input parameters stored with the calculation model at 1122. At 1136, the data provider node 1112 can filter its associated data and return the filtered data to the pipeline entry point 1110. In some cases, the filtering can be omitted, and 1134 can be a request for all data, and 1136 can include returning all data to the pipeline entry point procedure 1110.

At 1140, the pipeline entry point 1110 can send data to the data operator node 1114 for processing, such as for calculation, sorting, or combining. With reference to FIG. 11B, the relevant operations are carried out by the data operator node 1114 at 1144, and the corresponding data returned to the pipeline entry point 1110. If the pipeline entry point 1110 includes multiple data operator nodes 1114, 1140 and 1144 may be carried out multiple times, such as being carried out for each operator node. In some cases, data for all data provider nodes 1112 is requested by, and sent to, the pipeline entry point 1110, at 1134, 1136. In other cases, data retrieval and data operations can be carried out sequentially, with requests 1134 to data provider nodes 1112 being interspersed with requests 1140 to data operator nodes 1114.

When operations for all of the other nodes 1112, 1114 of the calculation model have been carried out, at 1148, the pipeline entry point 1110 sends a request to the union node 1116 for the combined data of the nodes. At 1152, the union node 1116 combines all of the data from the other nodes (e.g., data provider nodes 1112 and operator nodes 1114), and returns the data to the pipeline entry point 1110. At 1156, the pipeline entry point 1110 returns the results of the union operation to the calculation model executor 1106 as a single output table.

The calculation mode executor 1106, at 1160, generates and sends a request to the calculation model 1108 that the output table be stored. At 1164, the calculation model 1108 stores the output table and returns success to the calculation model executor 1106. The calculation model executor 1106 generates and sends a request to the calculation model 1108 at 1168 for the output table. The output table is sent to the calculation model executor 1106 by the calculation model 1108 at 1172.

Example 13—Example Data Navigation Screen

Figure 12:
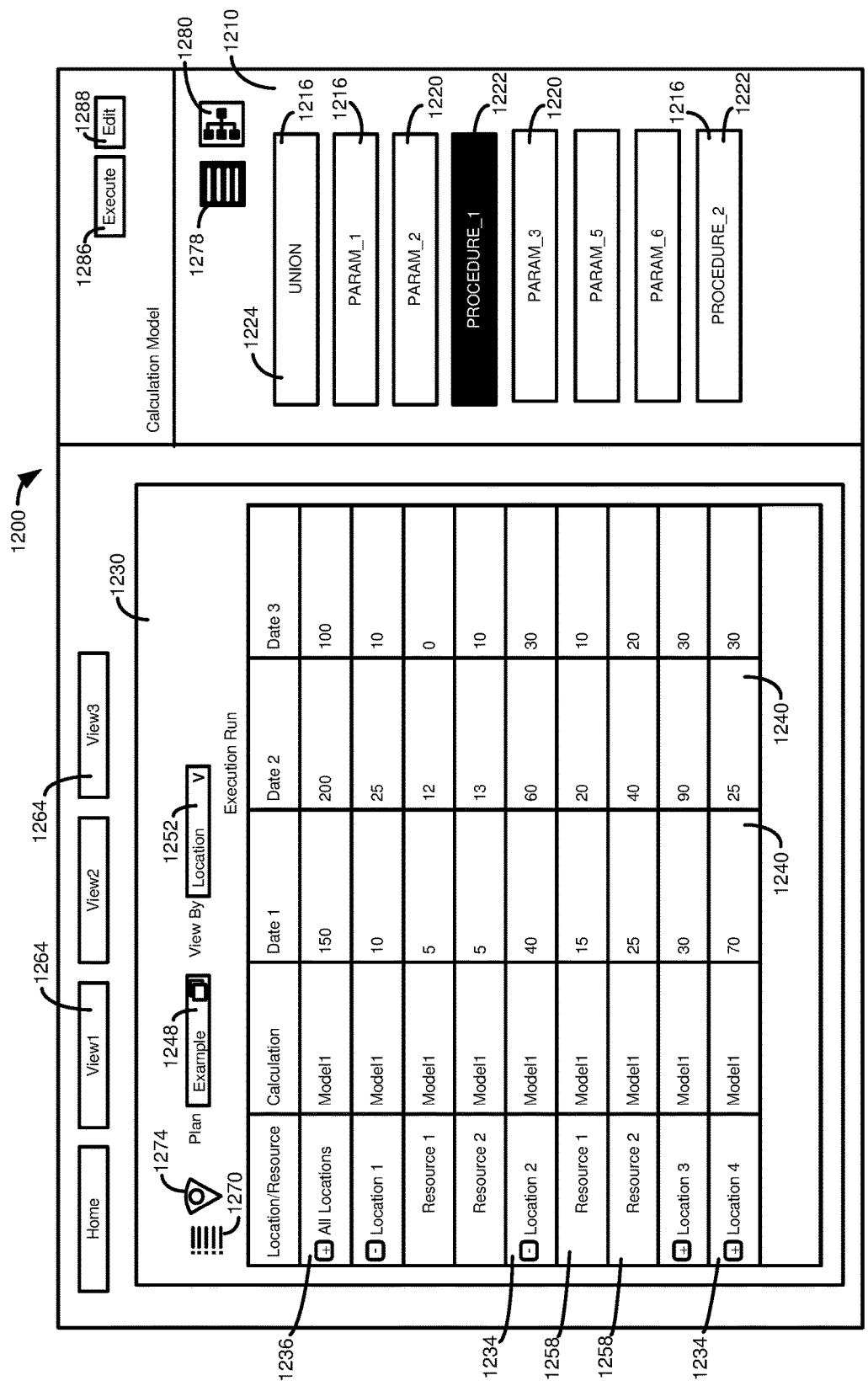
FIG. 12 is an example screen providing a user interface for manipulating execution results of a calculation model of a data flow modeled according to the architecture of FIG. 7.

FIG. 12 is a diagram of an example screen 1200 that can be used to view data associated with a data flow, such as a data flow 914 modelled as described in Example 10. The screen 1200 can include a panel 1210, shown at the right side of the screen, that displays nodes 1216 associated with the data flow. For example, the data flow depicted in FIG. 12 includes a plurality of provider nodes 1220, a plurality of operator nodes 1222, and a union node 1224 which includes the data from each of the other nodes 1216.

The user can view data associated with each of the nodes 1216 by selecting a particular node. For instance, FIG. 12 illustrates the operator node 1222 associated with a filter as selected. The data from the selected node 1216 can be displayed in a results portion 1230 of the display 1200. The results portion 1230 can include rows 1234 corresponding to various data elements of the selected node 1216. For example, if the operator node 1222 represents the total supply of an item at all locations, rows 1234 may represent the stock of the item at particular location. The results portion 1230 can also include a row 1236 representing total stock. The stock quantity can be displayed in columns 1240. In at least some implementations, the columns 1240 can represent the value (e.g., quantity of stock) at a particular date for each of the locations/rows 1234, 1236.

If the user selects another node 1216 from the panel 1210, the information displayed in the results portion 1230 can change to provide the data associated with the newly selected node. The format of the results portion 1230 can, in at least some implementations, change depending on which of the nodes 1216 is selected.

The screen 1200 can include a plan selection field 1248, where a user can select a particular data analysis plan to be displayed. A data analysis plan can include a particular calculation model (corresponding to a particular data flow), runtime parameters (such as parameters to be applied by operator nodes), display formats, and scheduling (e.g., having an analysis performed at particular intervals). The screen 1200 can also include view selection field 1252, where a user can select a particular view to be applied to a data set. For example, screen 1200 is organized by location, with particular items for each location being displayed using detail rows 1258. If desired, a user could change the view, such as viewing the results by resource, with detail rows 1258 providing access to information showing the quantity of the resources at particular locations.

Screen 1200 also include various data views that are available for the data analysis. A user may navigate to a different view by selecting the appropriate view name 1264. For example, the screen 1200 is shown as providing a supply and demand view. A user could navigate to a key performance indicator view, for example, by selecting an approve view icon 1264.

The screen 1200 provides icons that allow data to be viewed in a tabular format, as shown, using table icon 1270, or in a graphical format, using icon 1274. The graphical format can be, in a particular example, a map graphically depicting particular locations and listing data values (such as inventory) associated with each location.

Different views may also be provided for the panel 1210 displaying the nodes 1216. A table icon 1278 can be used to provide a tabular listing of node 1216, as shown. By selecting a graph icon 1280, the user can navigate to a graphical depiction of the nodes. The graphical depiction can illustrate, for example, relationships between the nodes 1216.

The screen 1200 can provide a user with access to a selected calculation model, such as a calculation model associated with a plan specified in field 1248. For example, an execute icon 1286 can allow a user to execute the calculation model using current data. An icon 1288 can allow a user to edit the calculation model, such as editing filter settings or other parameters.

As noted above, many analytical software applications provide no, or limited, options for data analysis. Even when options are provided, it can be difficult for a user, such as an end user, to appreciate differences between the analysis options. This Example 13 illustrates how a user may select from multiple data analysis options, and obtain information from various aspects of the analysis logic, including source data, intermediate data, and a final result.

Example 14—Example Data Navigation Method

Figure 13:
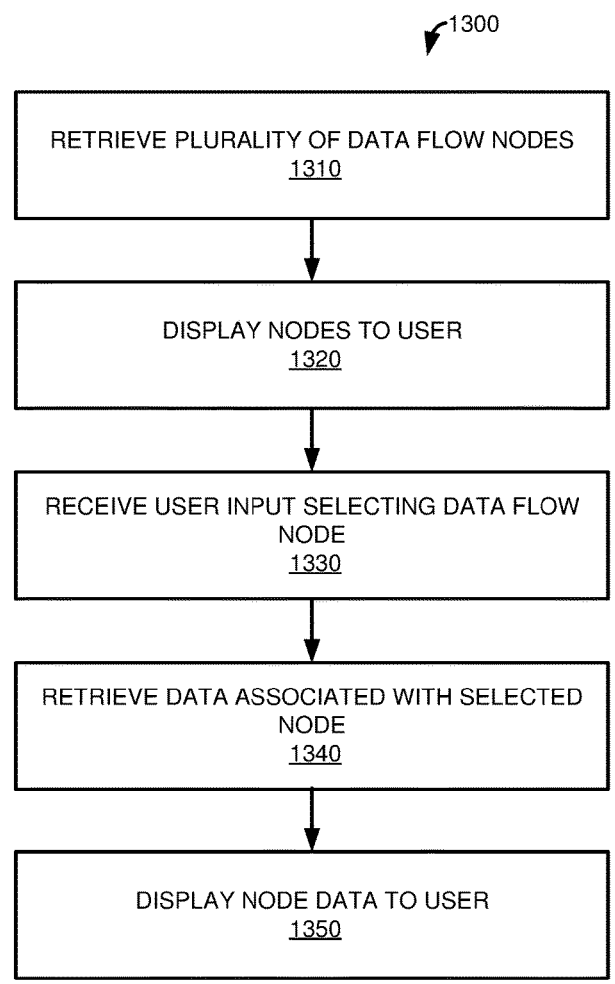
FIG. 13 is a flowchart of an example method of navigating nodes of a data flow.

FIG. 13 is a flowchart of an example method 1300 of navigating a data flow, such as to retrieve data associated with various nodes of the data flow. In particular aspects, the method 1300 can be carried out using the example screen 1200 of FIG. 12, and may be implemented using the user interface 790 of FIG. 7, such as using the analysis results component 788 to retrieve selected data, and using the layout manager 794 to generate a display. In other aspects, the method 1300 can be carried out using a different screen, or in a different manner.

At 1310, a plurality of data flow nodes are retrieved. For example, the data flow nodes can be retrieved from the application data store 762, such as using a component of the application 708. The nodes are displayed to a user at 1320, such as using the layout manager 794.

At 1330, user input is received (such as using the user interface 790) selecting a data flow node. Data associated with the selected node is retrieved at 1340. For example, the data can be fetched from the calculation model 758 or the analysis result store 768, or from a component of the application 708, such as a cache. The node data of the selected node is displayed to the user at 1350.

The method 1300 can be advantageous, as it can allow a user to view various components of a data flow or data analysis, in addition to the final results. This can allow the user to obtain more or better information, including providing greater context for the final results of the data analysis.

Example 15—Example Data Visualization

Figure 14:
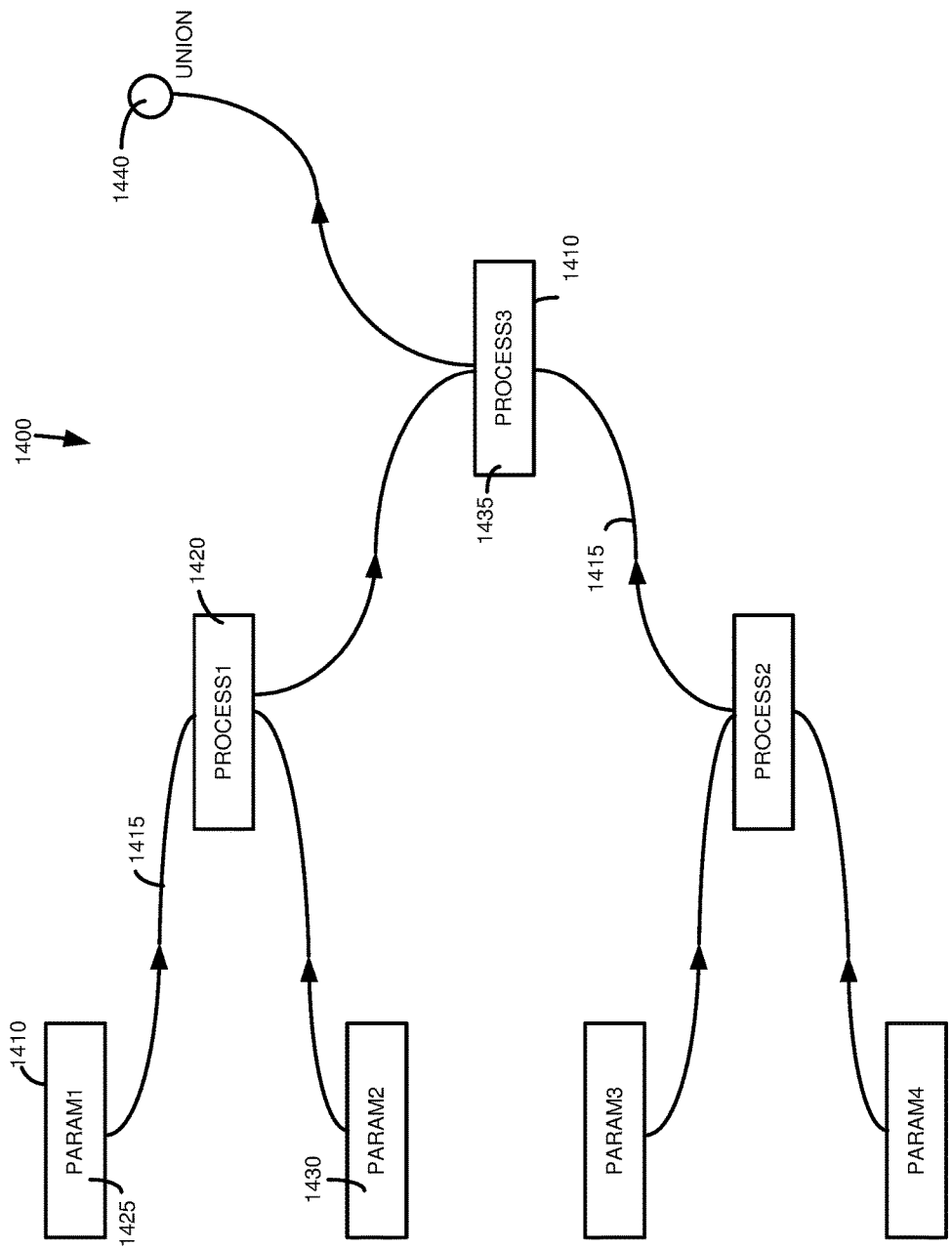
FIG. 14 is an example data flow visualization of a data flow modeled using the architecture of FIG. 7.

FIG. 14 is an example diagram that can be used to provide a visualization 1400 of a data flow, such as illustrating the nodes 1410 of a data flow and their interrelation. In a specific example, the visualization may be displayed when the user selects the graph icon 1280 of the screen 1200 of FIG. 12.

The visualization illustrates the nodes 1410 sequentially, from left to right, in the order they are processed in the data flow. Lines 1415 connect related nodes 1410, with arrowheads indicating the direction of data transfer/processing. In the example data flow of FIG. 14, an operator node 1420, PROCESS1, has inputs of provider nodes 1425, 1430, corresponding to PARAM1 and PARAM2. The output of operator node 1420 is used as the input to operator node 1435, associated with PROCESS3. The output of operator node 1435 is shown as input to a union node 1440. Although not depicted in FIG. 14, the union node 1440 may be connected to all of the nodes 1410. However, for simplicity of presentation, each connection of each node 1410 to the union node 1440 need not be shown.

In at least some cases, the visualization 1500 can be constructed using a dataset created during registration of a model object providing the calculation model underlying the visualization. For example, the dataset may be maintained in the calculation model 758 of the application data store 762 of FIG. 7. In a specific example, the dataset includes the following columns:

| Column | Description |
| --- | --- |
| NODE_ID | Value used to identify node contents in output table/calculation model execution results |
| SUBSEQUENT_NODE_ID | Node(s) connected to the NODE_ID |
| X | Value in X-axis |
| Y | Value in Y-axis |
| RESULT_VISIBLE | Node display format (e.g., union node or provider/operator node) |

The values of the NODE_ID column can be used to select contents from the data flow, such as by filtering or selecting data from an output table (e.g., the output table 928 of FIG. 9). The values of the SUBSEQUENT_NODE_ID, X, and Y columns can be used to generate the visualization of the data flow. For example, values in the SUBSEQUENT_NODE_ID column can be used identify nodes connected to a particular node (e.g., to generated the arrows 1415). The values in the X and Y column can be used to put a particular node in the proper position in the visualization. In particular implementations, the values for the SUBSEQUENT_NODE_ID, X, and Y columns can be obtained from a calculation model 758 of FIG. 7, such as from the node metadata 776 and/or the layout 778 and logical hierarchy stores 780. The RESULT_VISIBLE column can be used to indicate whether a particular node should be shown in the display 1400.

The display 1400 can provide a user, such as an end user, with an overview of a data flow. The display 1400 can be provided within an application, such as the application 708 of FIG. 7. Thus, a user may be provided with a representation of a data flow without needing the technical skills to access the application for creating or editing a data flow. In addition, the display 1400 may be easier for a user, such as an end user, to understand, such as by displaying the information most likely to be of relevance. In some cases, the display 1400 may be interactive. For example, the user may be presented with a display of data associated with a node 1410 when the user selects the node.

As noted above, many analytical software applications provide no, or limited, options for data analysis. Even when options are provided, it can be difficult for a user, such as an end user, to appreciate differences between the analysis options. This Example 16 illustrates how a user may select from multiple data analysis options. The display 1400 illustrates how the present disclosure can enable a user to understand the data flow underlying a particular analysis, so that the user can select the most appropriate analysis options, and can optimize their use of the analysis.

Example 16—Example Data Visualization Method

Figure 15:
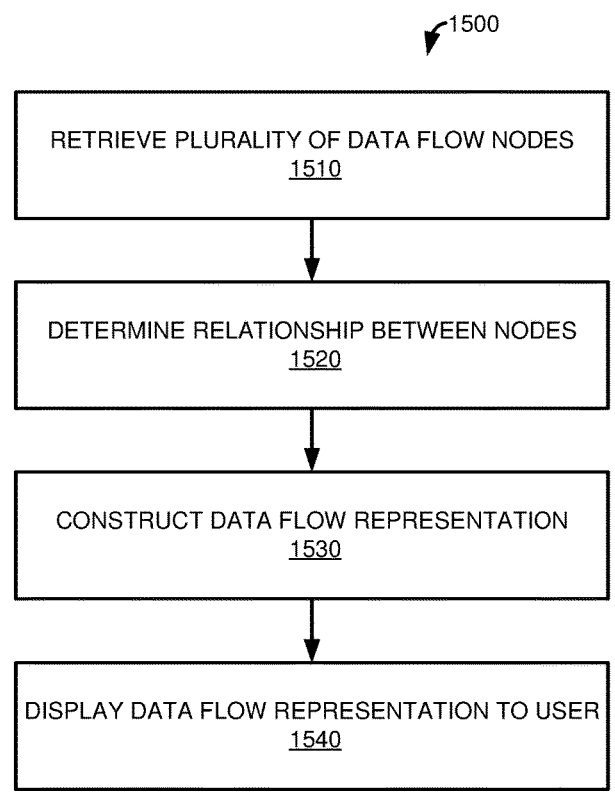
FIG. 15 is a flowchart of an example method of providing a data flow visualization.

FIG. 15 is a flowchart of an example method 1500 of providing a data flow visualization. In particular aspects, the method 1500 can be carried out using the example screen 1400 of FIG. 14, and may be implemented using the user interface 790 of FIG. 7, such as using the node store 774, the layout 778, and the logical hierarchy 780 of FIG. 7. In other aspects, the method 1400 can be carried out using a different screen, or in a different manner.

At 1510, a plurality of data flow nodes associated with a data flow are retrieved, such as from the node store 774. The relationship between nodes (such as parent-child node relationships) are determined at 1520, such as using metadata in the node store 774, the layout 778, or the logical hierarchy 780. A data flow representation is constructed at 1530, such as using the layout manager 794 of the application 708. At 1540, the data flow representation can be displayed to a user.

The method 1500 can include additional steps. For example, in some cases, the data flow representation displayed to the user at 1540 can be interactive. In particular examples, a user can select a particular node of the data flow and the display can present the user with data associated with the selected node.

The visualization can help a user understand how a data flow or data analysis is constructed, which can allow the user to obtain greater insights regarding the data, as well as providing the user with more information than typical data analyses.

Example 17—Example Technical Solution

The technical solution can provide data flows representing an analysis logic having a consistent structure or signature, such as a single output table, that can facilitate creation and execution of the data flow. For example, by using a single output table, query operations can be specified without relying on the number, type, or relationship of nodes within the data flow. In particular aspects, static, rather than dynamic, SQL statements can be used, which can improve performance and help reduce security risks.

The technical solution can also provide more loosely coupled data flows. For example, the data flows can be created without conforming to rigid naming or identification conventions. In a particular example, each node in a data flow can be associated with a node identifier. An output table, such as a single output table from the workflow, can be specified in terms of node identifiers, such by including a node identifier column as the first column in the output table. As the node identifiers are maintained in information, such as metadata, associated with each node, any node name may be used without affecting the output table.

By facilitating the use of data flows in software applications, these technical solutions can make it easier for users to create and edit analysis logics. By providing information about the nodes in a data flow, and their interrelation, the present disclosure can empower users to select appropriate analysis logics, and to optimize their use, as the user can understand the flow of information involved in the analysis, rather than having an analysis logic be a black box.

The following features can be implemented to provide end users with information regarding a data flow, and access to information associated with the data flow.

Example 18—Example Feature: Access to Node Information Using Node Listing

In any of the inventive examples herein, a user can be provided with access to information from a particular node of a data flow by selecting the node from a list of nodes. For example, as user may elect to display information regarding a final calculation step of a data flow, the results of an intermediate calculation step, or source data used for calculations. Having access to source and intermediate data can provide the user with additional insights regarding the final results of the logic analysis represented by the data flow, as well as insights from steps within the data flow.

Node data can be selected by filtering an output table of the data flow by the node identifier of the selected node. As the node identifier can be decoupled from the name of the node, the user can select information associated with a node without knowing the name of the node, or a specific convention from which the node name could be determined.

Example 19—Example Feature: Node Visualization

In any of the examples herein, a user can be provided with a visualization of nodes in a data flow and their interrelation. For example, the visualization may depict the nodes in a sequential order, including illustrating which nodes provide input to other nodes. In at least some cases, a user may select a node in the visualization and be provided with data corresponding to the node. Having access to a visual depiction of the data flow can provide a user with a better understanding of the underlying logic analysis, which may increase the quality and quality of information the user obtains from the data flow.

Example 20—Example Computing Systems

Figure 16:
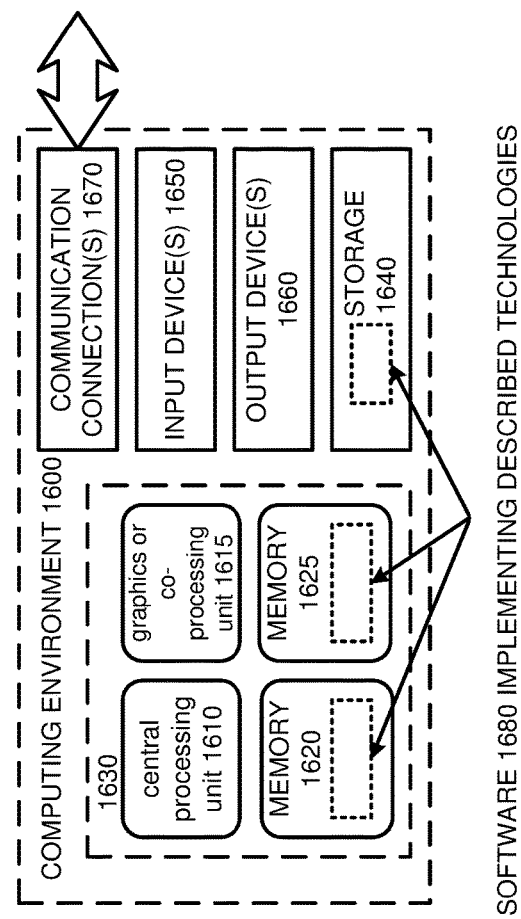
FIG. 16 is a diagram of an example computing system in which described embodiments can be implemented.

FIG. 16 illustrates a generalized example of a suitable computing system 1600 in which several of the described innovations may be implemented. The computing system 1600 is not intended to suggest any limitation as to scope of use or functionality, as the innovations may be implemented in diverse general-purpose or special-purpose computing systems.

With reference to FIG. 16, the computing system 1600 includes one or more processing units 1610, 1615 and memory 1620, 1625. In FIG. 16, this basic configuration 1630 is included within a dashed line. The processing units 1610, 1615 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 16 shows a central processing unit 1610 as well as a graphics processing unit or co-processing unit 1615. The tangible memory 1620, 1625 may be volatile memory (e.g., registers, cache, RAM), non-volatile memory (e.g., ROM, EEPROM, flash memory, etc.), or some combination of the two, accessible by the processing unit(s). The memory 1620, 1625 stores software 1680 implementing one or more innovations described herein, in the form of computer-executable instructions suitable for execution by the processing unit(s).

A computing system may have additional features. For example, the computing system 1600 includes storage 1640, one or more input devices 1650, one or more output devices 1660, and one or more communication connections 1670. An interconnection mechanism (not shown) such as a bus, controller, or network interconnects the components of the computing system 1600. Typically, operating system software (not shown) provides an operating environment for other software executing in the computing system 1600, and coordinates activities of the components of the computing system 1600.

The tangible storage 1640 may be removable or non-removable, and includes magnetic disks, magnetic tapes or cassettes, CD-ROMs, DVDs, or any other medium which can be used to store information in a non-transitory way and which can be accessed within the computing system 1600. The storage 1640 stores instructions for the software 1680 implementing one or more innovations described herein. The storage 1640 does not include signals per se.

The input device(s) 1650 may be a touch input device such as a keyboard, mouse, pen, or trackball, a voice input device, a scanning device, or another device that provides input to the computing system 1600. For video encoding, the input device(s) 1650 may be a camera, video card, TV tuner card, or similar device that accepts video input in analog or digital form, or a CD-ROM or CD-RW that reads video samples into the computing system 1600. The output device(s) 1660 may be a display, printer, speaker, CD-writer, or another device that provides output from the computing system 1600.

The communication connection(s) 1670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 21—Example Cloud-Supported Environment

Figure 17:
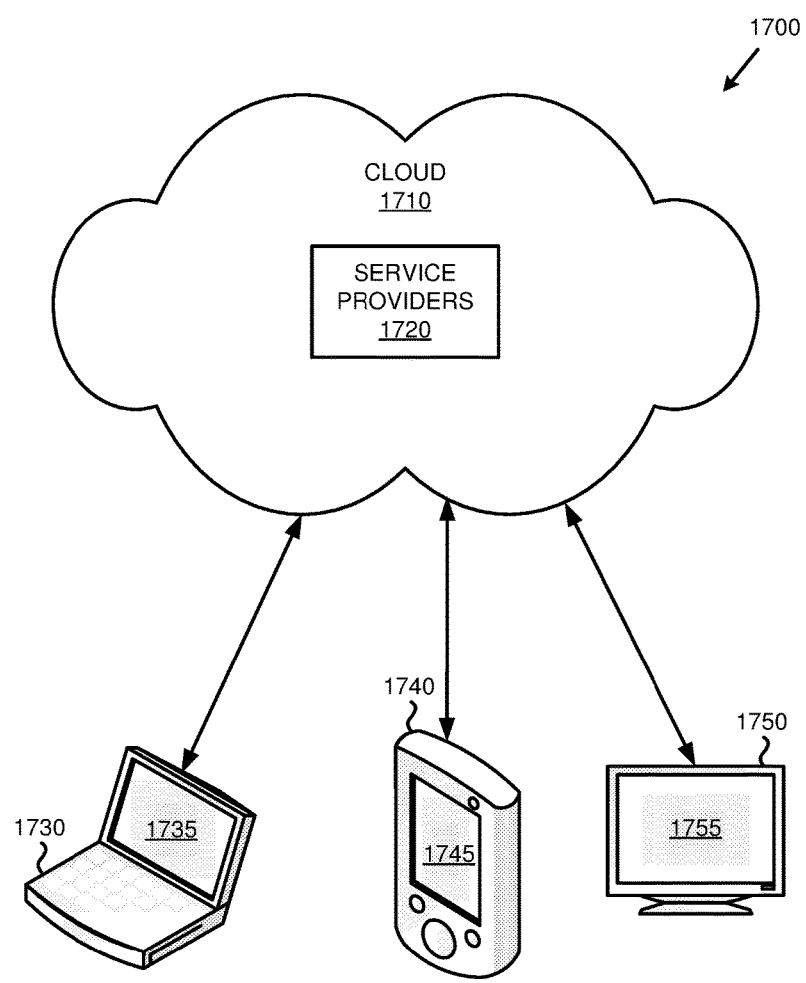
FIG. 17 is an example cloud-support environment that can be used in conjunction with the technologies described herein.

In example environment 1700 of FIG. 17, the cloud 1710 provides services for connected devices 1730, 1740, 1750 with a variety of screen capabilities. Connected device 1730 represents a device with a computer screen 1735 (e.g., a mid-size screen). For example, connected device 1730 could be a personal computer such as desktop computer, laptop, notebook, netbook, or the like. The connected device 1740 represents a device with a mobile device screen 1745 (e.g., a small size screen). For example, the connected device 1740 could be a mobile phone, smart phone, personal digital assistant, tablet computer, and the like. The connected device 1750 represents a device with a large screen 1755. For example, the connected device 1750 could be a television screen (e.g., a smart television) or another device connected to a television (e.g., a set-top box or gaming console) or the like. One or more of the connected devices 1730, 1740, 1750 can include touch screen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1700. For example, the cloud 1710 can provide services for one or more computers (e.g., server computers) without displays.

Services can be provided by the cloud 1710 through service providers 1720, or through other providers of online services (not depicted). For example, cloud services can be customized to the screen size, display capability, and/or touch screen capability of a particular connected device (e.g., connected devices 1730, 1740, 1750).

In example environment 1700, the cloud 1710 provides the technologies and solutions described herein to the various connected devices 1730, 1740, 1750 using, at least in part, the service providers 1720. For example, the service providers 1720 can provide a centralized solution for various cloud-based services. The service providers 1720 can manage service subscriptions for users and/or devices (e.g., for the connected devices 1730, 1740, 1750 and/or their respective users).

Example 22—Computer-Readable Media

Any of the computer-readable media herein can be non-transitory (e.g., volatile memory such as DRAM or SRAM, nonvolatile memory such as magnetic storage, optical storage, or the like) and/or tangible. None of the computer-readable media herein include signals per se. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Example 23—Alternatives

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. All that comes within the scope and spirit of the claims is therefore claimed as the invention.

What is claimed is:

1. One or more computer-readable media comprising computer-executable instructions that when executed cause a computing system to perform processing to generate execution results of a data processing procedure, the processing comprising:

retrieving data associated with respective nodes of a plurality of nodes in a data processing procedure, each of the respective nodes comprising a respective node identifier, at least a first node of the plurality of nodes providing first data to be operated on during the data processing procedure and at least a second node of the plurality of nodes being an operator node, the operator node specifying the at least a first node as an input source, and carrying out one or more operations on the first data to provide an output to an output destination;

calculating a data union at a union node, wherein the union node is a final node in a sequence of the plurality of nodes in the data processing procedure and receives first input comprising the output of the at least a second node and second input received from the at least a first node, the second input comprising a node identifier of the at least a first node; and storing at least a portion of the data union in an output table, the output table comprising a node identifier column and a plurality of rows, at least a portion of the rows comprising the node identifier of the at least a first node as a value for the node identifier column;

wherein rows of at least a portion of the rows of the output table are associated with a respective one of the plurality of nodes and comprise the node identifier of the respective associated node and at least a portion of the retrieved data from the respective associated node.

2. The one or more computer-readable media of claim 1, wherein each of the plurality of nodes is associated with node metadata, the node metadata comprising the node identifier of the respective node.

3. The one or more computer-readable media of claim 1, the processing further comprising:
selecting execution results from the output table that are associated with a selected one of the plurality of nodes using the node identifier of the selected node.

4. The one or more computer-readable media of claim 3, the processing further comprising:
executing query operations on an output of the union node to provide the output table.

5. The one or more computer-readable media of claim 1, the processing further comprising:
executing query operations on an output of the union node to provide the output table.

6. The one or more computer-readable media of claim 1, the processing further comprising:
executing a static query on an output of the union node to provide the output table.

7. The one or more computer-readable media of claim 1, the processing further comprising:
executing a static structured query language statement on an output of the union node to provide the output table.

8. The one or more computer-readable media of claim 1, wherein each of the plurality of nodes comprises a node container, the node container for each respective node comprising node annotations storing the node identifier for the node.

9. The one or more computer-readable media of claim 1, the processing further comprising:
displaying a list of nodes;
receiving user input selecting a node;
filtering the output table by the node identifier corresponding to the selected node to obtain data associated with the selected node; and
displaying the data associated with the selected node to a user.

10. The one or more computer-readable media of claim 1, the processing further comprising:
retrieving metadata associated with the plurality of nodes, the metadata comprising, for each of the plurality of nodes, a first node identifier associated with the node and at least a second node identifier identifying a connected node;
determining the relationship of the nodes based on the metadata; and
displaying to a user a visual representation of a data flow associated with the nodes, the visual representation visually representing the nodes and their interconnection.

11. The one or more computer-readable media of claim 1, the processing further comprising:
receiving user input comprising a navigation action;
retrieving metadata associated with at least one of the plurality of nodes, the metadata comprising a view associated with the navigation action; and
displaying the view to the user.

12. The one or more computer-readable media of claim 1, the processing further comprising:
presenting a plurality of calculation models to a user; and
receiving user input selecting a calculation model of the plurality of calculation models to be executed;
wherein the plurality of nodes are associated with the selected calculation model.

13. The one or more computer-readable media of claim 1, the processing further comprising:
presenting a plurality of calculation models to a user;
displaying to the user analysis logic associated with one or more of the plurality of calculation models; and
receiving user input selecting a calculation model of the plurality of calculation models to be executed;
wherein the plurality of nodes are associated with the selected calculation model.

14. The method of claim 1, wherein the output table is generated from a single node data output of the data processing procedure.

15. A system comprising:
memory;
one or more hardware processors coupled to the memory;
one or more computer-readable media storing instructions that, when loaded into the memory, cause the one or more hardware processors to perform, based on user input, operations for:
defining a data flow, the data flow comprising:
a plurality of nodes arranged in a sequence, the plurality of nodes comprising:
a first node providing first data to be operated on during the data flow;
a second node, the second node being an operator node and specifying the first node as an input source, the second node carrying out one or more operations on the first data to provide an output to an output destination; and
a union node which is a final node of the sequence of nodes of the data flow, the union node receiving first input comprising the output of the second node and second input received from the first node, the second input comprising a node identifier of the first node; and
a single output table; and
at the union node, receiving data from at least a portion of the plurality of nodes earlier in the sequence, and producing the single output table, the single output table comprising at least a portion of the received data, the output table comprising a node identifier column and a plurality of rows, at least a portion of rows of the output table being associated with a respective node of the plurality of nodes, other than the union node, and comprising the node identifier of the respective associated node and at least a portion of the data received from the respective associated node.

16. The system of claim 15, the operations further comprising:
for nodes of the plurality of nodes, defining node metadata comprising the node identifier for a respective node; and
defining the node identifier column in the output table.

17. The system of claim 15 the operations further comprising:
for each of the plurality of nodes, defining a node navigation identifier, the node navigation identifier specifying a data view to be displayed in response to a user navigation action.

18. A method implemented at least in part by a computing system, the method comprising:
retrieving data associated with respective nodes of a plurality of nodes in a data processing procedure, nodes of the respective nodes associated with node data and comprising a respective node identifier stored in node metadata associated with a given respective node, at least a first node of the plurality of nodes providing first data to be operated on during the data processing procedure and at least a second node of the plurality of nodes being an operator node, the operator node specifying the at least a first node as an input source, and carrying out one or more operations on the first data to provide an output to an output destination;

at a union node of the data processing procedure, calculating a data union, the union node being the final node in a node processing sequence associated with the data processing procedure, the union node receiving first input comprising the output of the at least a second node and second input received from the at least a first node, the second input comprising a node identifier of the at least a first node, the union node providing an output; and storing at least a portion of the output of the union node in an output table, the output table comprising a node identifier column and a plurality of rows;

wherein rows associated with the at least a portion of the output of the union node in the output table are associated with a respective one of the plurality of nodes and comprise the node identifier of the respective associated node and at least a portion of the data retrieved from the respective associated node.

19. The method of claim 18, wherein the output table is generated from a single node data output of the data processing procedure.

20. The method of claim 18, further comprising:

executing a static structured query language statement on the output of the union node to provide the output table.

* * * * *